(12) United States Patent
Wang et al.

(10) Patent No.: US 11,549,014 B2
(45) Date of Patent: Jan. 10, 2023

(54) RESIN COMPOSITION AND ARTICLE MADE THEREFROM

(71) Applicant: Elite Electronic Material (KunShan) Co., Ltd., Kunshan (CN)

(72) Inventors: Rongtao Wang, Kunshan (CN); Ningning Jia, Kunshan (CN); Zhenfang Shang, Kunshan (CN); Weimiao Yu, Kunshan (CN)

(73) Assignee: ELITE ELECTRONIC MATERIAL (KUNSHAN) CO., LTD., Kunshan (CN)

( * ) Notice: Subject to any disclaimer, the term of this patent is extended or adjusted under 35 U.S.C. 154(b) by 337 days.

(21) Appl. No.: 16/942,405

(22) Filed: Jul. 29, 2020

(65) Prior Publication Data

US 2021/0371657 A1    Dec. 2, 2021

(30) Foreign Application Priority Data

May 27, 2020    (CN) .......................... 202010462287.5

(51) Int. Cl.
| | |
|---|---|
| B32B 27/28 | (2006.01) |
| B32B 27/38 | (2006.01) |
| C08L 79/08 | (2006.01) |
| C08J 5/24 | (2006.01) |
| C08J 5/18 | (2006.01) |

(52) U.S. Cl.
CPC .................. *C08L 79/08* (2013.01); *C08J 5/18* (2013.01); *C08J 5/244* (2021.05); *C08J 5/246* (2021.05); *C08J 2379/08* (2013.01); *C08J 2463/00* (2013.01); *C08J 2479/00* (2013.01); *C08J 2483/04* (2013.01); *C08L 2205/03* (2013.01)

(58) Field of Classification Search
None
See application file for complete search history.

(56) References Cited

U.S. PATENT DOCUMENTS

2018/0186976 A1*   7/2018   Sung ..................... C08L 9/06
2018/0371243 A1*  12/2018   Hu ....................... B32B 5/022

FOREIGN PATENT DOCUMENTS

| CN | 106397767 A | * | 2/2017 | ............ C07D 265/16 |
| CN | 110818868 A | * | 2/2020 | ............. C08G 14/06 |
| JP | 2016196548 A | * | 11/2016 | ............... C08L 37/00 |

OTHER PUBLICATIONS

Machine translation of JP-2016196548-A (no date).*
Machine translation of CN-106397767-A (no date).*
Machine translation of CN-110818868-A (no date).*

* cited by examiner

*Primary Examiner* — Michael J Feely
(74) *Attorney, Agent, or Firm* — Muncy, Geissler, Olds & Lowe, P.C.

(57) ABSTRACT

A resin composition is useful for preparing an article such as a prepreg, a resin film, a laminate or a printed circuit board. The resin composition includes a benzoxazine resin of Formula (1) and a maleimide resin. The article made from the resin composition has high thermal resistance, low dielectric properties and high dimensional stability and meets the processability requirements of printed circuit boards involving multiple lamination processes and multiple assembly operations.

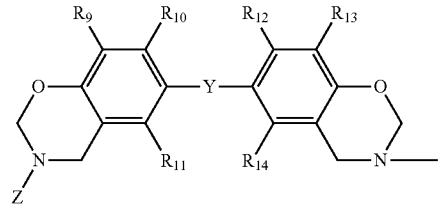

Formula (1)

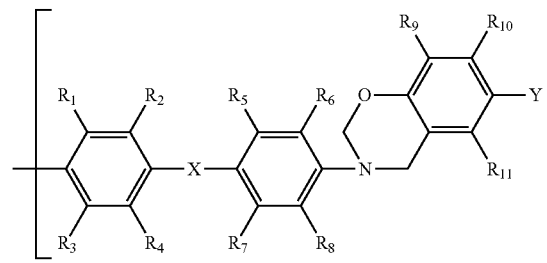

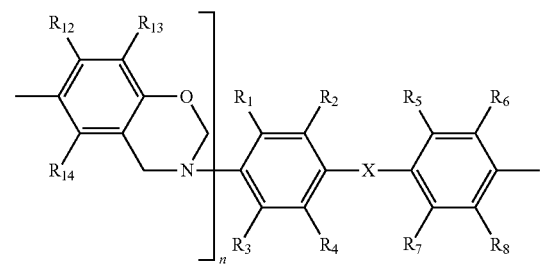

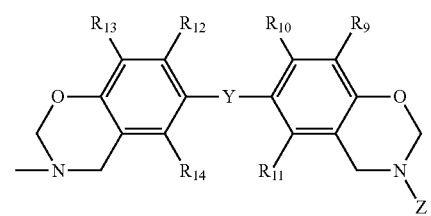

14 Claims, 1 Drawing Sheet

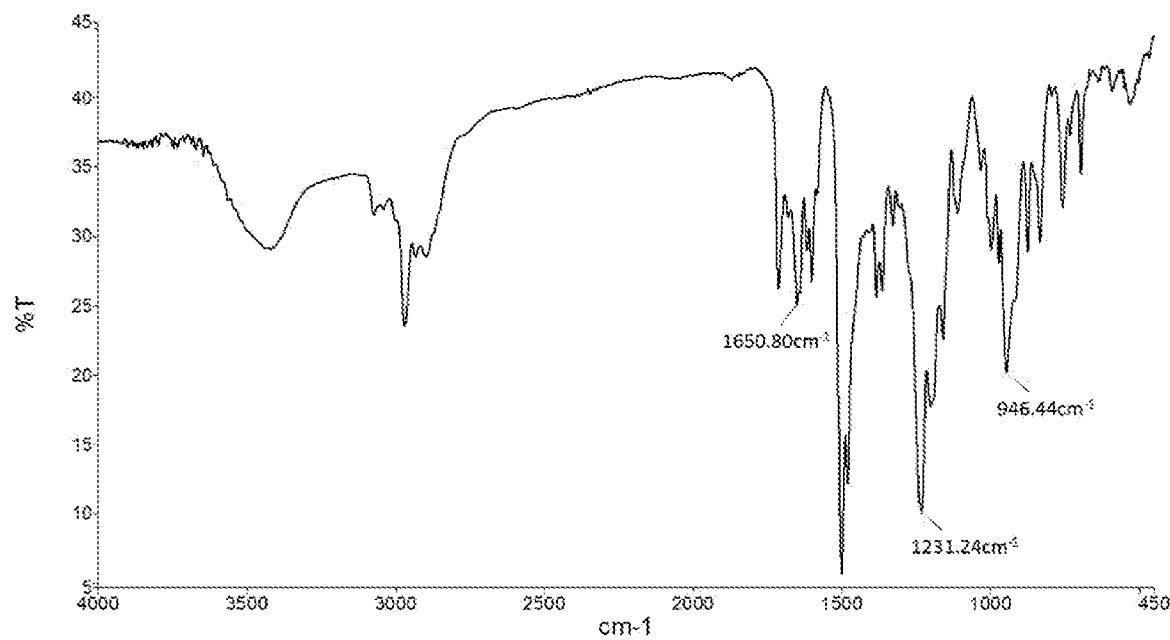

RESIN COMPOSITION AND ARTICLE MADE THEREFROM

CROSS-REFERENCE TO RELATED APPLICATION

This application claims the priority benefits of China Patent Application No. 202010462287.5, filed on May 27, 2020. The entirety of the above-mentioned patent application is hereby incorporated by reference herein and made a part of this specification.

BACKGROUND

1. Field of the Disclosure

The present disclosure pertains to the field of resin composition and more particularly to a resin composition useful for preparing an article such as a prepreg, a resin film, a laminate or a printed circuit board.

2. Description of Related Art

With the advent of the 5G generation, technology upgrade of printed circuit boards for mobile communication and automobile electronics requires the fundamental insulation materials in printed circuit boards to achieve not only high thermal resistance and low dielectric properties but also high dimensional stability, so as to meet the processability requirements of printed circuit boards involving multiple lamination processes and multiple assembly operations.

Conventionally, to achieve high thermal resistance, maleimide resins were usually used in conjunction with benzoxazine resins to make laminates and printed circuit boards; however, resin compositions containing maleimide resins and conventional benzoxazine resins fail to meet the growing demands of high thermal resistance, low dielectric properties, and high dimensional stability.

Accordingly, there is an urgent need in the present technical field to develop a resin composition having high thermal resistance, low dielectric properties, and high dimensional stability.

SUMMARY

To solve the above-mentioned problems, the present disclosure provides a resin composition, comprising:
(A) a maleimide resin; and
(B) a benzoxazine resin of Formula (1):

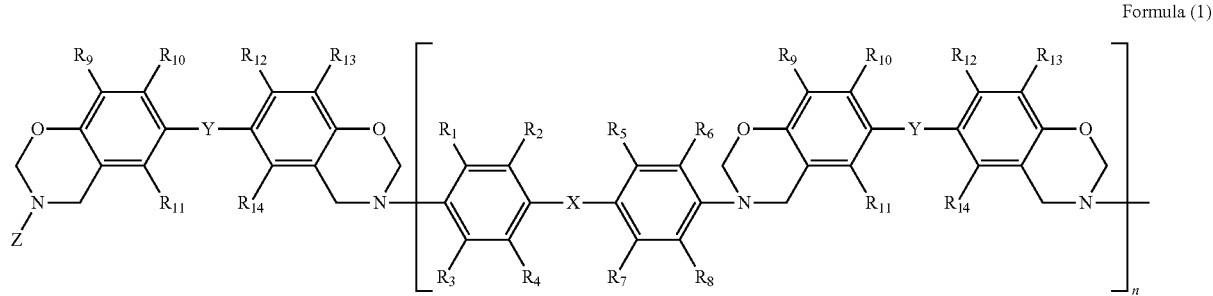

Formula (1)

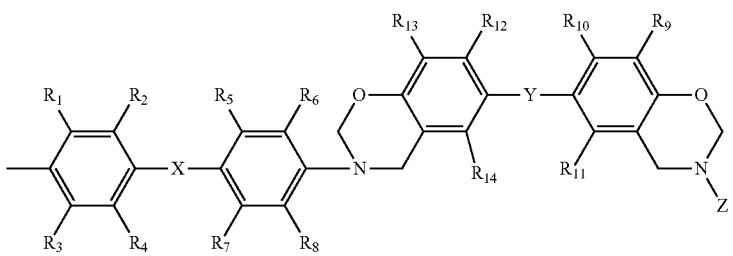

wherein, each X is independently a covalent bond, —O— or —CH$_2$—;
each Y is independently a covalent bond or —C(CH$_3$)$_2$—;
each Z is independently an alkyl group with 1 to 8 carbon atoms, an alkenyl group with 2 to 8 carbon atoms, a phenyl group or a benzyl group;
R$_1$, R$_2$, R$_3$, R$_4$, R$_5$, R$_6$, R$_7$ and R$_8$ independently represent a hydrogen atom, a methyl group or an ethyl group;
R$_9$, R$_{10}$, R$_{11}$, R$_{12}$, R$_{13}$ and R$_{14}$ independently represent a hydrogen atom or an alkenyl group with 2 to 4 carbon atoms, and R$_9$, R$_{10}$, R$_{11}$, R$_{12}$, R$_{13}$ and R$_{14}$ are not a hydrogen atom at the same time; and n is an integer of 0 to 10.

In one or more embodiments, the benzoxazine resin of Formula (1) comprises a benzoxazine resin of Formula (2), a benzoxazine resin of Formula (3), a benzoxazine resin of Formula (4), a benzoxazine resin of Formula (5), a benzoxazine resin of Formula (6) or a combination thereof:

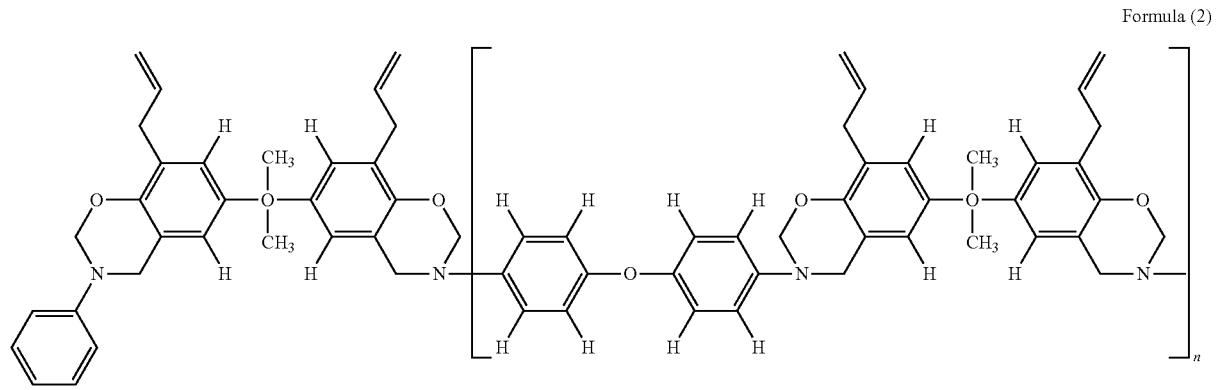

Formula (2)

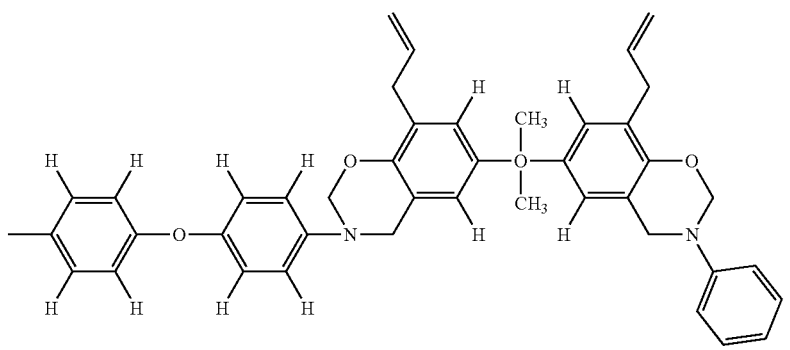

Formula (3)

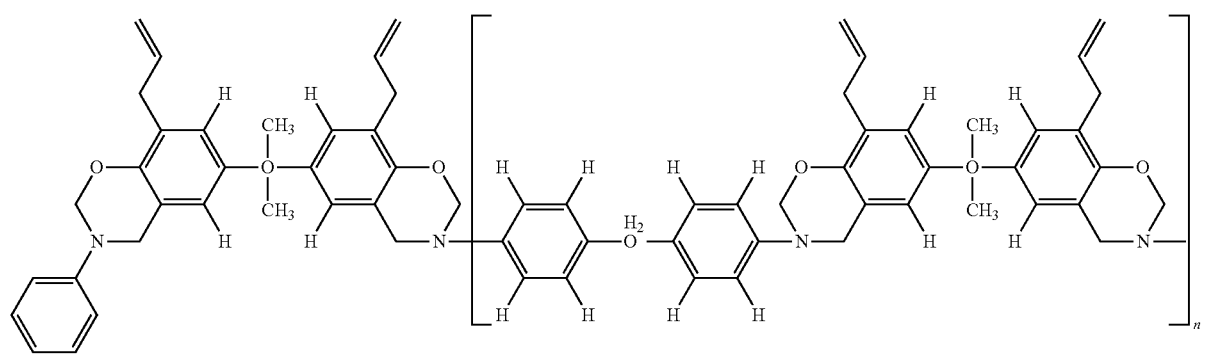

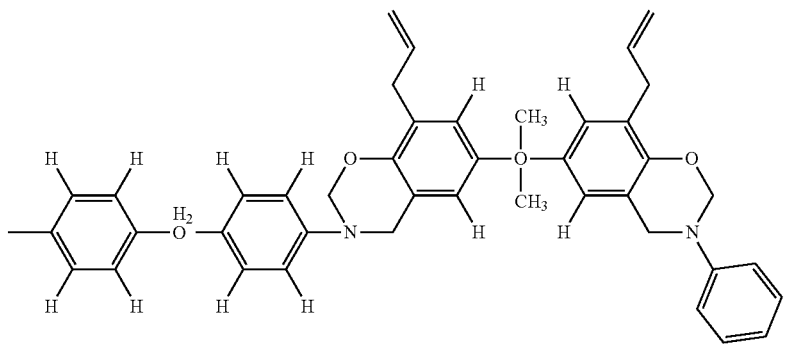

-continued
Formula (4)
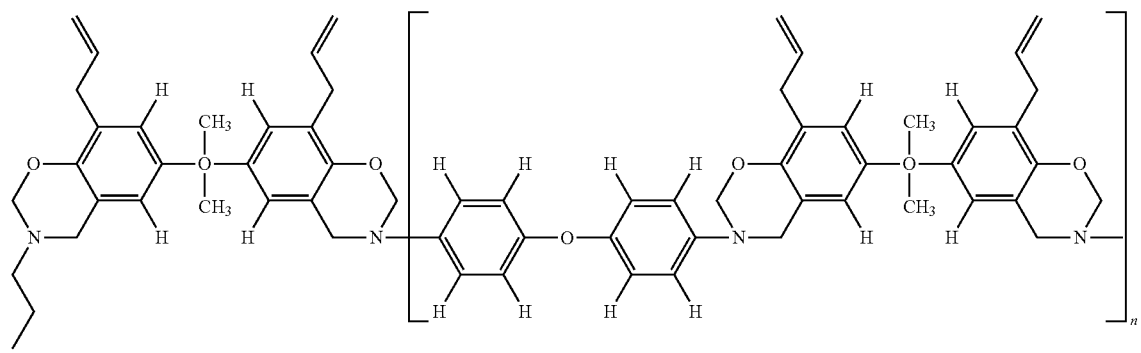
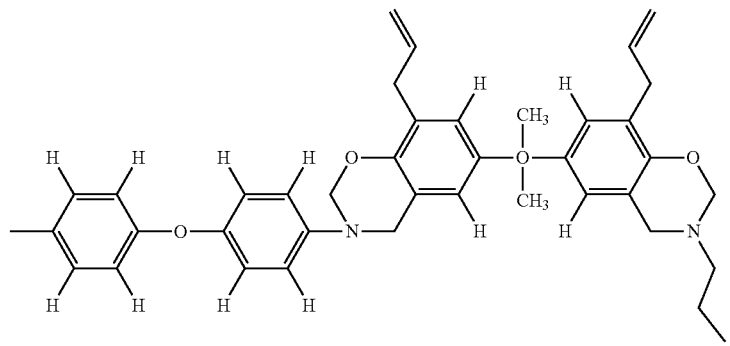
Formula (5)
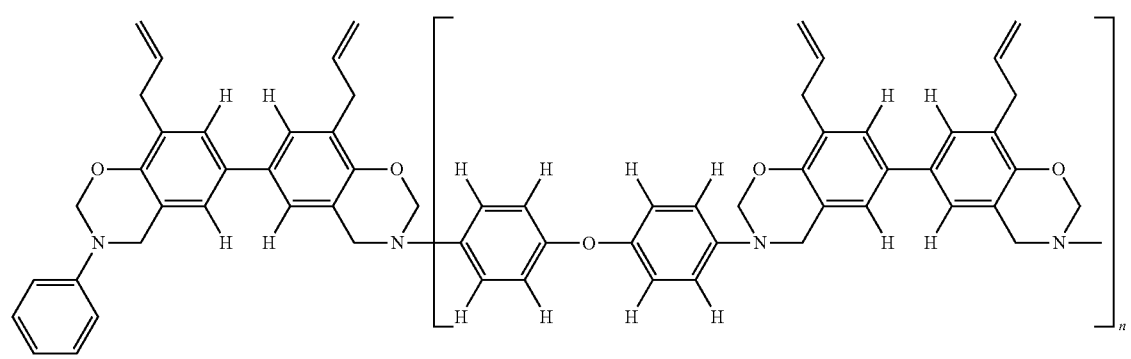
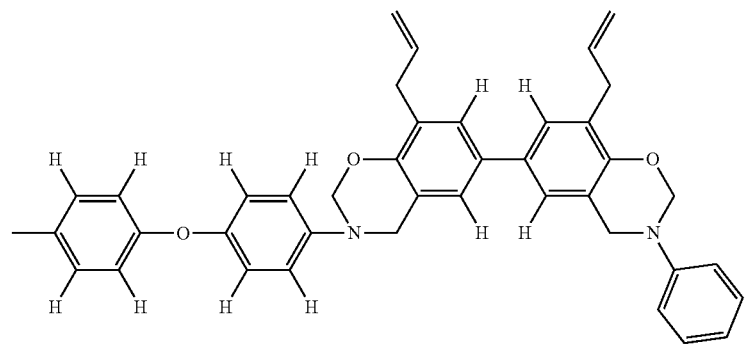

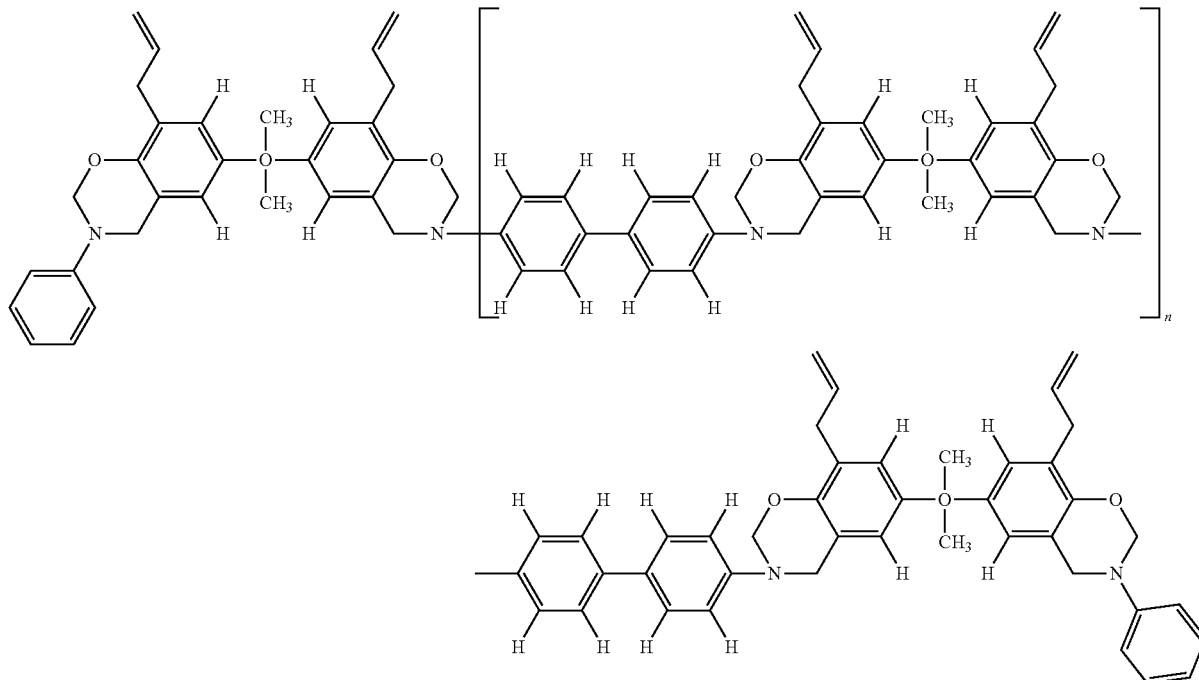

Formula (6)

n is an integer of 0 to 10 in Formula (2) to Formula (6).

In one or more embodiments, in the resin composition, a weight ratio of the maleimide resin and the benzoxazine resin of Formula (1) is 100:10-40.

In one or more embodiments, the maleimide resin comprises 4,4'-diphenylmethane bismaleimide, polyphenylmethane maleimide, bisphenol A diphenyl ether bismaleimide, 3,3'-dimethyl-5,5'-diethyl-4,4'-diphenylmethane bismaleimide, 3,3'-dimethyl-5,5'-dipropyl-4,4'-diphenylmethane bismaleimide, m-phenylene bismaleimide, 4-methyl-1,3-phenylene bismaleimide, 1,6-bismaleimide-(2,2,4-trimethyl)hexane, N-2,3-xylylmaleimide, N-2,6-xylylmaleimide, N-phenyl maleimide, vinyl benzyl maleimide, maleimide resin containing aliphatic long chain structure, prepolymer of diallyl compound and maleimide resin, prepolymer of diamine and maleimide resin, prepolymer of multi-functional amine and maleimide resin, prepolymer of acid phenol compound and maleimide resin or a combination thereof.

In one or more embodiments, the resin composition further comprises a component (C) which comprises epoxy resin, organic silicone resin, polyphenylene ether resin, cyanate ester resin, active ester, vinylbenzyl-dicyclopentadiene phenylene ether, bis(vinylbenzyl)ether, 1,2-bis(vinylphenyl)ethane, divinylbenzene, triallyl isocyanurate, triallyl cyanurate, 1,2,4-trivinyl cyclohexane, diallyl bisphenol A, styrene, acrylate, polyolefin, phenolic resin, styrene maleic anhydride resin, amine curing agent, polyamide, polyimide, or a combination thereof.

In one or more embodiments, in the resin composition, a weight ratio of (A) the maleimide resin and the component (C) is 100:1-100.

In one or more embodiments, the resin composition further comprises flame retardant, inorganic filler, curing accelerator, polymerization inhibitor, solvent, silane coupling agent, surfactant, coloring agent, toughening agent or a combination thereof.

The present disclosure also provides an article made from the resin composition of any embodiment, which comprises a prepreg, a resin film, a laminate or a printed circuit board.

In one or more embodiments, the article has a glass transition temperature as measured by using a dynamic mechanical analyzer by reference to IPC-TM-650 2.4.24.4 of greater than or equal to 350° C.

In one or more embodiments, the article has a T288 thermal resistance as measured by reference to IPC-TM-650 2.4.24.1 of greater than 70 minutes.

In one or more embodiments, the article has a dissipation factor at 10 GHz as measured by reference to HS C2565 of less than or equal to 0.0066.

In one or more embodiments, the article has a percent of thermal expansion in Z-axis as measured by using a thermomechanical analyzer by reference to IPC-TM-650 2.4.24.5 in a temperature range of 50° C. to 260° C. of less than or equal to 0.50%.

In one or more embodiments, the article has a coefficient of thermal expansion in Z-axis as measured by using a thermomechanical analyzer by reference to IPC-TM-650 2.4.24.5 in a temperature range of 50° C. to 110° C. of less than or equal to 15 ppm/° C.

In one or more embodiments, the article has a coefficient of thermal expansion in Y-axis as measured by using a thermomechanical analyzer by reference to IPC-TM-650 2.4.24.5 in a temperature range of 50° C. to 110° C. of less than or equal to 9.0 ppm/° C.

The resin composition disclosed herein achieves high thermal resistance, low dielectric properties and high dimensional stability, thereby meeting the growing demands in high thermal resistance, low dielectric properties and high dimensional stability of insulation materials for printed circuit boards and the processability requirements of printed circuit boards involving multiple lamination processes and multiple assembly operations.

BRIEF DESCRIPTION OF THE DRAWINGS

The sole FIGURE illustrates the FTIR spectrum of Product A1.

DESCRIPTION OF THE EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

While some theories or mechanisms may be proposed herein, the present disclosure is not bound by any theories or mechanisms described regardless of whether they are right or wrong, as long as the embodiments can be implemented according to the present disclosure.

As used herein, "a," "an" or any similar expression is employed to describe components and features of the present disclosure. This is done merely for convenience and to give a general sense of the scope of the present disclosure. Accordingly, this description should be read to include one or at least one and the singular also includes the plural unless it is obvious to mean otherwise.

As used herein, "or a combination thereof" means "or any combination thereof", and "any" means "any one", vice versa.

As used herein, the term "encompass," "encompassing," "comprises," "comprising," "includes," "including," "has," "having" or any other variant thereof is construed as an open-ended transitional phrase intended to cover a non-exclusive inclusion. For example, a composition or manufacture that comprises a list of elements is not necessarily limited to only those elements but may include other elements not expressly listed or inherent to such composition or manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "encompass," "encompassing," "comprises," "comprising," "includes," "including," "has," "having" or any other variant thereof, it is understood that close-ended transitional phrases such as "consisting of," "composed by" and "remainder being" and partially open-ended transitional phrases such as "consisting essentially of," "primarily consisting of," "mainly consisting of," "primarily containing," "composed essentially of," "essentially having," etc. are also disclosed and included.

In this disclosure, features and conditions such as values, numbers, contents, amounts or concentrations are presented as a numerical range or a percentage range merely for convenience and brevity. Therefore, a numerical range or a percentage range should be interpreted as encompassing and specifically disclosing all possible subranges and individual numerals or values therein, including integers and fractions, particularly all integers therein. For example, a range of "1.0 to 8.0" or "between 1.0 and 8.0" should be understood as explicitly disclosing all subranges such as 1.0 to 8.0, 1.0 to 7.0, 2.0 to 8.0, 2.0 to 6.0, 3.0 to 6.0, 4.0 to 8.0, 3.0 to 8.0 and so on and encompassing the endpoint values, particularly subranges defined by integers, as well as disclosing all individual values in the range such as 1.0, 2.0, 3.0, 4.0, 5.0, 6.0, 7.0 and 8.0. Unless otherwise defined, the aforesaid interpretation rule should be applied throughout the present disclosure regardless of broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or FIGURES have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of X1, X2 and X3," it is intended to disclose the situations of X is X1 and X is X1 and/or X2 and/or X3. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of X1, X2 and X3" and Y is described as being "selected from a group consisting of Y1, Y2 and Y3," the disclosure includes any combination of X is X1 and/or X2 and/or X3 and Y is Y1 and/or Y2 and/or Y3.

Unless otherwise specified, according to the present disclosure, a compound refers to a chemical substance formed by two or more elements bonded with chemical bonds and may comprise a small molecule compound and a polymer compound, but not limited thereto. Any compound disclosed herein is interpreted to not only include a single chemical substance but also include a class of chemical substances having the same kind of components or having the same property.

Unless otherwise specified, according to the present disclosure, a polymer refers to the product formed by monomer(s) via polymerization and usually comprises multiple aggregates of polymers respectively formed by multiple repeated simple structure units by covalent bonds; the monomer refers to the compound forming the polymer. A polymer may comprise a homopolymer, a copolymer, a prepolymer, etc., but not limited thereto. A prepolymer refers to a polymer having a lower molecular weight between the molecular weight of monomer and the molecular weight of final polymer, and a prepolymer contains a reactive functional group capable of participating further polymerization to obtain the final polymer product which has been fully crosslinked or cured. The term "polymer" includes but is not limited to an oligomer. An oligomer refers to a polymer with 2-20, typically 2-5, repeating units.

Unless otherwise specified, the term "resin" of the present disclosure is a widely used common name of a synthetic polymer and is construed as comprising monomer and its combination, polymer and its combination or a combination of monomer and its polymer, but not limited thereto. For example, in the present disclosure, the term "maleimide resin" is construed to encompass a maleimide monomer, a maleimide polymer, a combination of maleimide monomers, a combination of maleimide polymers, and a combination of maleimide monomer(s) and maleimide polymer(s).

Unless otherwise specified, in the present disclosure, the term "vinyl-containing" is construed to encompass the inclusion of a vinyl group, an allyl group, a (meth)acrylate group or a combination thereof.

Unless otherwise specified, according to the present disclosure, a modification comprises a product derived from a resin with its reactive functional group modified, a product derived from a prepolymerization reaction of a resin and other resins, a product derived from a crosslinking reaction of a resin and other resins, a product derived from homopolymerizing a resin, a product derived from copolymerizing a resin and other resins, etc.

The unsaturated bond described herein, unless otherwise specified, refers to a reactive unsaturated bond, such as but not limited to an unsaturated double bond with the potential of being crosslinked with other functional groups, such as an unsaturated carbon-carbon double bond with the potential of being crosslinked with other functional groups, but not limited thereto.

Unless otherwise specified, according to the present disclosure, when the term acrylate is expressed as (meth) acrylate, it is intended to comprise both situations of containing and not containing a methyl group; for example, (meth)acrylate is construed as including acrylate and methacrylate.

Unless otherwise specified, an alkyl group and an alkenyl group described herein are construed to encompass various isomers thereof. For example, a propyl group is construed to encompass n-propyl and iso-propyl.

Unless otherwise specified, as used herein, part(s) by weight represents weight part(s) in any weight unit, such as but not limited to kilogram, gram, pound and so on. For example, 100 parts by weight of the maleimide resin may represent 100 kilograms of the maleimide resin or 100 pounds of the maleimide resin.

It should be understood that all features disclosed herein may be combined in any way to constitute the solution of the present disclosure, as long as there is no conflict present in the combination of these features.

Examples and embodiments are described in detail below. It will be understood that these examples and embodiments are exemplary only and are not intended to limit the scope and use of the present disclosure. Unless otherwise specified, processes, reagents and conditions described in the examples and embodiments are those known in the art.

The present disclosure provides a resin composition, comprising:
(A) a maleimide resin; and
(B) a benzoxazine resin of Formula (1):

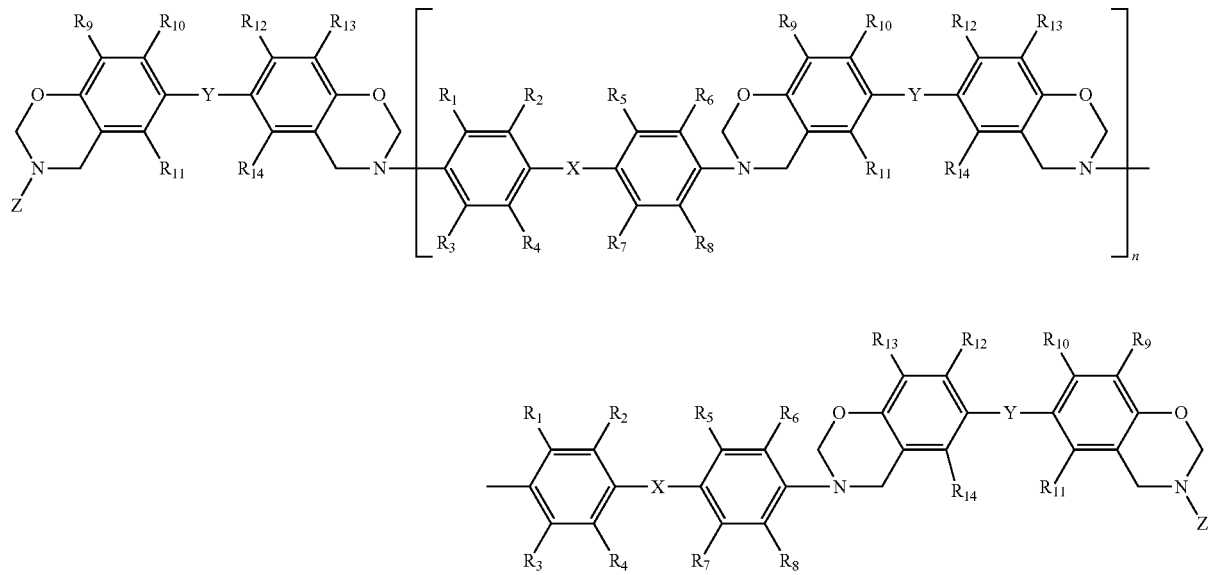

Formula (1)

wherein, each X is independently a covalent bond, —O— or —CH$_2$—; each Y is independently a covalent bond or —C(CH$_3$)$_2$—; each Z is independently an alkyl group with 1 to 8 carbon atoms, an alkenyl group with 2 to 8 carbon atoms, a phenyl group or a benzyl group, preferably an alkenyl group with 2 to 3 carbon atoms or a phenyl group, and more preferably an allyl group or a phenyl group;

R$_1$, R$_2$, R$_3$, R$_4$, R$_5$, R$_6$, R$_7$ and R$_8$ independently represent a hydrogen atom, a methyl group or an ethyl group, preferably a hydrogen atom; R$_9$, R$_{10}$, R$_{11}$, R$_{12}$, R$_{13}$ and R$_{14}$ independently represent a hydrogen atom or an alkenyl group with 2 to 4 carbon atoms, R$_9$ to R$_{14}$ are not a hydrogen atom at the same time, R$_9$ and R$_{13}$ are preferably an allyl group, and R$_{10}$, R$_{11}$, R$_{13}$ and R$_{14}$ are preferably a hydrogen atom; and n is an integer of 0 to 10.

In some embodiments, the benzoxazine resin of Formula (1) comprises a benzoxazine resin of Formula (2), a benzoxazine resin of Formula (3), a benzoxazine resin of Formula (4), a benzoxazine resin of Formula (5), a benzoxazine resin of Formula (6) or a combination thereof:

Formula (2)
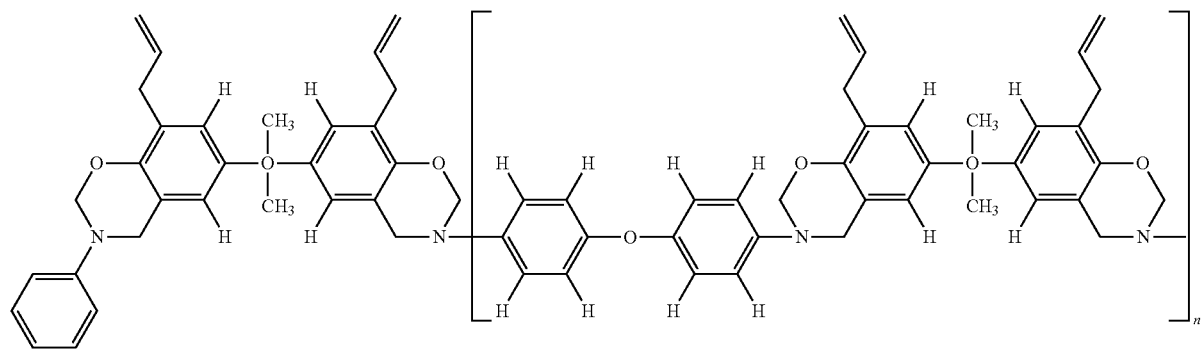
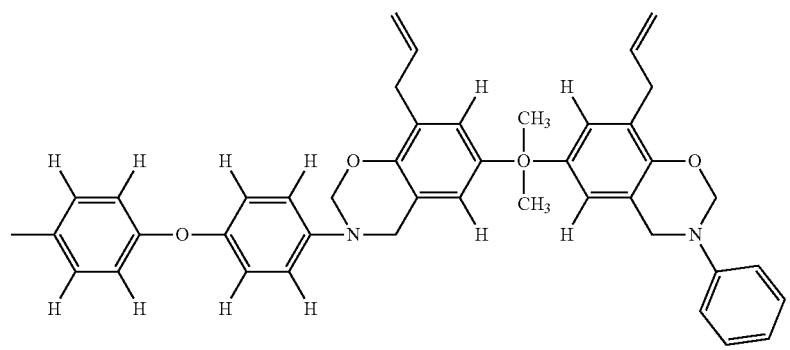
Formula (3)
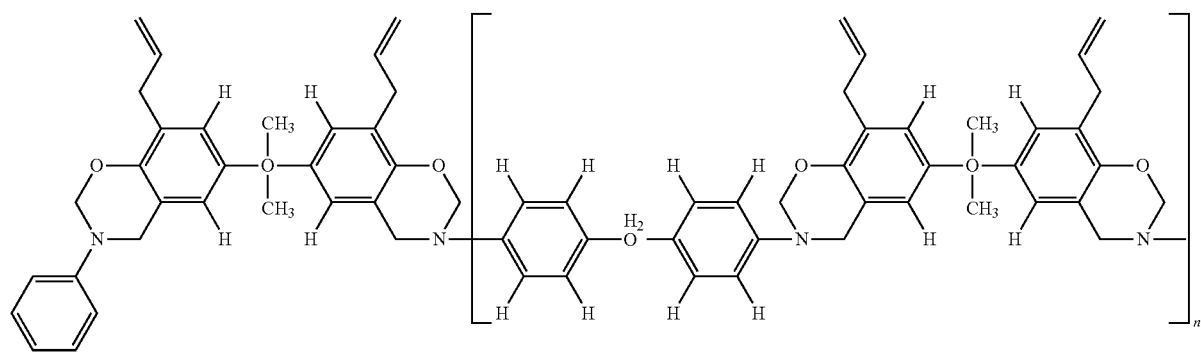
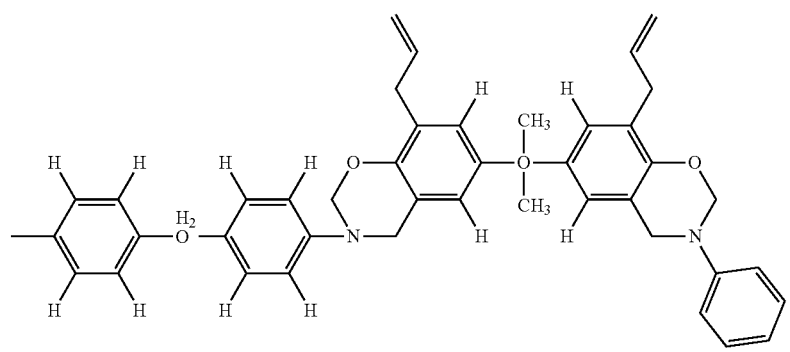

-continued
Formula (4)
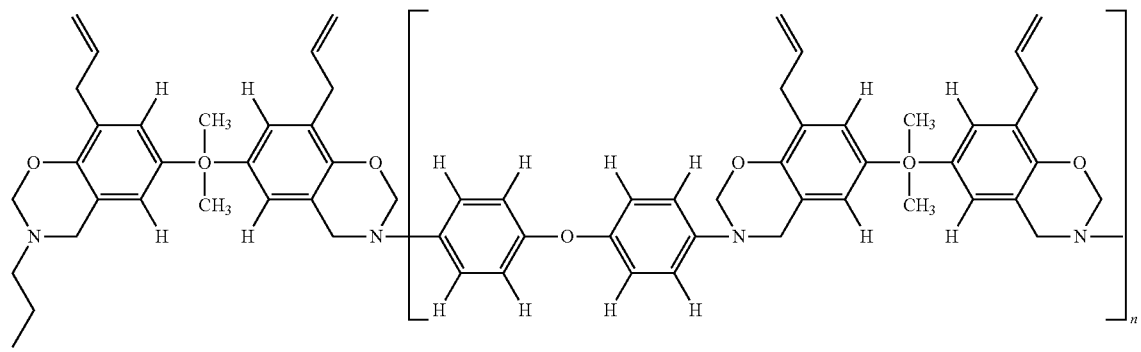
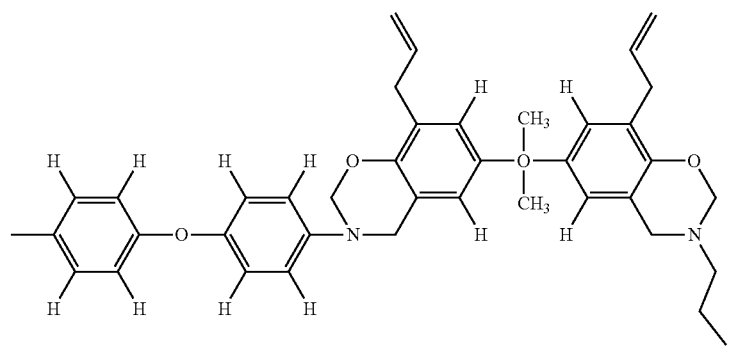
Formula (5)
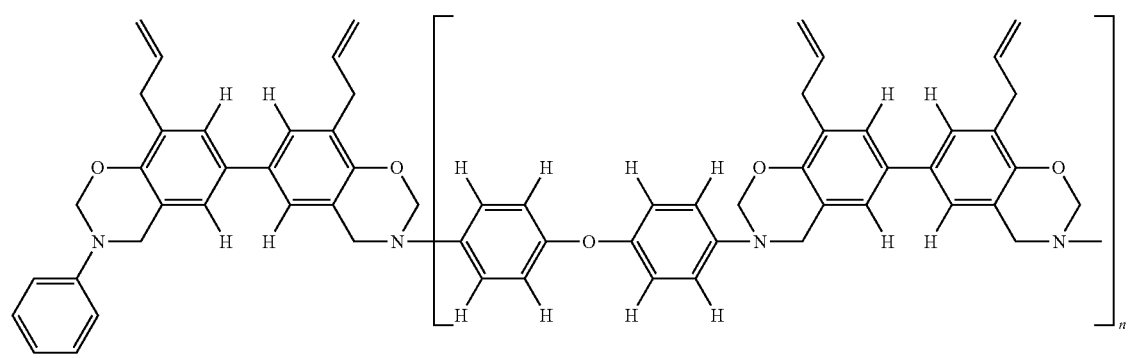
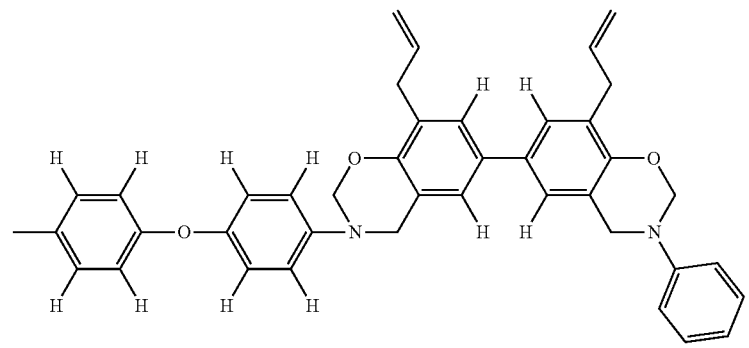

Formula (6)

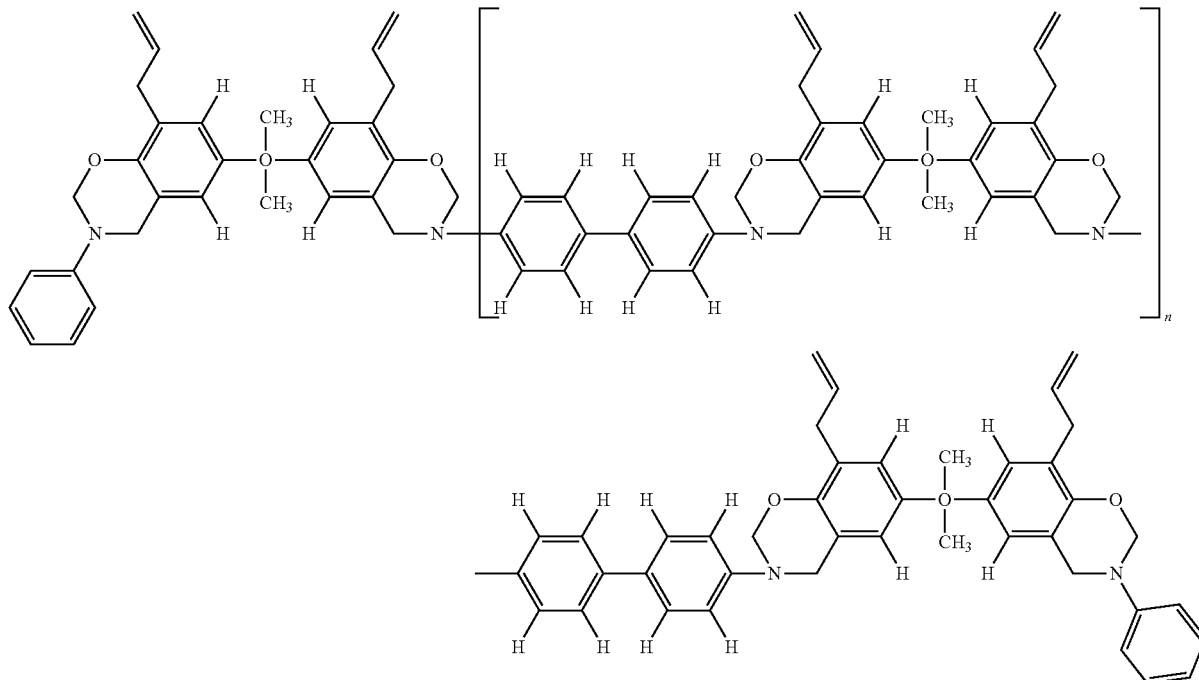

wherein n is an integer of 0 to 10.

The benzoxazine resin of Formula (1) of the present disclosure is prepared by a two-step condensation reaction. First, a bifunctional phenol, a bifunctional amine and formaldehyde were subjected to dehydration condensation to form a hydroxyl-terminated benzoxazine intermediate, followed by adding a monofunctional amine and formaldehyde to proceed dehydration condensation so as to obtain the benzoxazine resin of Formula (1). In the two-step condensation reaction, a molar ratio of the four raw materials used, i.e., bifunctional phenol, bifunctional amine, monofunctional amine and formaldehyde, is not particularly limited. The ratio of any two raw materials may be for example from 10:1 to 1:10, such as but not limited to 1:10, 1:8, 1:6, 1:4, 1:2, 1:1, 2:1, 4:1, 6:1, 8:1 or 10:1. For example, but not limited thereto, the molar ratio of the bifunctional phenol and the bifunctional amine may be from 10:1 to 1:10, preferably from 10:1 to 2:1. For example, but not limited thereto, the molar ratio of the bifunctional phenol and the monofunctional amine may be from 10:1 to 1:10, preferably from 1:1 to 1:10. For example, but not limited thereto, the molar ratio of the bifunctional amine and the formaldehyde may be from 10:1 to 1:10, preferably from 1:4 to 1:10. For example, but not limited thereto, the molar ratio of the monofunctional amine and the formaldehyde may be from 10:1 to 1:10, preferably from 1:4 to 1:10. The temperature of the two-step condensation reaction is generally 80-100° C. The reaction time is not particularly limited and may be such as 2-8 hours or 3-6 hours.

Unless otherwise specified, according to the resin composition of the present disclosure, the amount of each component contained in the resin composition is represented as the amount relative to a total of 100 parts by weight of the maleimide resin, and the amount of the benzoxazine resin of Formula (1) is not particularly limited. For example, relative to a total of 100 parts by weight of the maleimide resin, the amount of the benzoxazine resin of Formula (1) may be 10 parts by weight to 40 parts by weight, 10 parts by weight to 30 parts by weight, 25 parts by weight to 40 parts by weight, 25 parts by weight to 30 parts by weight, 30 parts by weight to 40 parts by weight, or 10 parts by weight to 25 parts by weight, but not limited thereto.

The maleimide resin of the present disclosure has the meaning as understood by a person having ordinary skill in the art and comprises a monomer containing at least one maleimide group, its polymer, or a combination thereof. Unless otherwise specified, the maleimide resin used in the present disclosure is not particularly limited and may include any one or more maleimide resins useful for preparing a prepreg, a resin film, a laminate or a printed circuit board. In some embodiments, the maleimide resin may comprise 4,4'-diphenylmethane bismaleimide, polyphenylmethane maleimide (a.k.a. oligomer of phenylmethane maleimide), bisphenol A diphenyl ether bismaleimide, 3,3'-dimethyl-5,5'-diethyl-4,4'-diphenylmethane bismaleimide (a.k.a. bis-(3-ethyl-5-methyl-4-maleimidephenyl)methane), 3,3'-dimethyl-5,5'-dipropyl-4,4'-diphenyl methane bismaleimide, m-phenylene bismaleimide, 4-methyl-1,3-phenylene bismaleimide, 1,6-bismaleimide-(2,2,4-trimethyl)hexane, N-2,3-xylylmaleimide, N-2,6-xylylmaleimide, N-phenylmaleimide, vinyl benzyl maleimide (VBM), maleimide resin containing aliphatic long chain structure, prepolymer of diallyl compound and maleimide resin, prepolymer of diamine and maleimide resin, prepolymer of multi-functional amine and maleimide resin, prepolymer of acid phenol compound and maleimide resin, or a combination thereof. These components should be construed as including their modifications.

For example, the maleimide resin may include products such as BMI-1000, BMI-1000H, BMI-1100, BMI-1100H, BMI-2000, BMI-2300, BMI-3000, BMI-3000H, BMI-4000, BMI-5000, BMI-5100, BMI-TMH, BMI-7000 and BMI- 7000H available from Daiwakasei Industry Co., Ltd., or products such as BMI-70 and BMI-80 available from K.I Chemical Industry Co., Ltd.

For example, the maleimide resin containing aliphatic long chain structure may include products such as BMI-689, BMI-1400, BMI-1500, BMI-1700, BMI-2500, BMI-3000, BMI-5000 and BMI-6000 available from Designer Molecules Inc.

In some embodiments, the maleimide resin used herein may comprise polyphenylmethane maleimide (e.g., BMI-2300), 3,3'-dimethyl-5,5'-diethyl-4,4'-diphenylmethane bismaleimide (e.g., BMI-5100), bisphenol A diphenyl ether bismaleimide (e.g., BMI-4000), maleimide resin containing aliphatic long chain structure (e.g., BMI-3000) or a combination thereof.

In addition to the maleimide resin and the benzoxazine resin of Formula (1), the resin composition of the present disclosure may further optionally comprise a component (C) which comprises epoxy resin, organic silicone resin, polyphenylene ether resin, cyanate ester resin, active ester, vinylbenzyl-dicyclopentadiene phenylene ether, bis(vinylbenzyl)ether, 1,2-bis(vinylphenyl)ethane, divinylbenzene, triallyl isocyanurate, triallyl cyanurate, 1,2,4-trivinyl cyclohexane, diallyl bisphenol A, styrene, acrylate, polyolefin, phenolic resin, styrene maleic anhydride resin, amine curing agent, polyamide, polyimide, or a combination thereof. These components should be construed as including their modifications.

Unless otherwise specified, relative to a total of 100 parts by weight of the maleimide resin, any component of the component (C) described above may range from 1 part by weight to 100 parts by weight, and the ratio therebetween can be adjusted according to the need.

In some embodiments, the resin composition of the present disclosure further comprises an epoxy resin. The epoxy resin suitable for the present disclosure may be any epoxy resins known in the field to which this disclosure pertains, including but not limited to bisphenol A epoxy resin, bisphenol F epoxy resin, bisphenol S epoxy resin, bisphenol AD epoxy resin, novolac epoxy resin, trifunctional epoxy resin, tetrafunctional epoxy resin, multifunctional epoxy resin, dicyclopentadiene (DCPD) epoxy resin, phosphorus-containing epoxy resin, p-xylene epoxy resin, naphthalene epoxy resin (e.g., naphthol epoxy resin), benzofuran epoxy resin, isocyanate-modified epoxy resin, or a combination thereof. The novolac epoxy resin may be phenol novolac epoxy resin, bisphenol A novolac epoxy resin, bisphenol F novolac epoxy resin, biphenyl novolac epoxy resin, phenol benzaldehyde epoxy resin, phenol aralkyl novolac epoxy resin, o-cresol novolac epoxy resin, or a combination thereof. The phosphorus-containing epoxy resin may be DOPO (9,10-dihydro-9-oxa-10-phosphaphenanthrene-10-oxide) epoxy resin, DOPO-HQ epoxy resin or a combination thereof. The DOPO epoxy resin may comprise DOPO-containing phenol novolac epoxy resin, DOPO-containing cresol novolac epoxy resin, DOPO-containing bisphenol-A novolac epoxy resin, or a combination thereof the DOPO-HQ epoxy resin may comprise DOPO-HQ-containing phenol novolac epoxy resin, DOPO-HQ-containing o-cresol novolac epoxy resin, DOPO-HQ-containing bisphenol-A novolac epoxy resin, or a combination thereof. These components should be construed as including their modifications. In some embodiments, the epoxy resin used herein is a naphthalene epoxy resin (e.g., naphthalene epoxy resins HP-9500 and HP-6000 available from DIC Corporation), biphenyl novolac epoxy resin (e.g., biphenyl novolac epoxy resin NC-3000-H available from Nippon Kayaku) or a combination thereof.

Preferably, relative to a total of 100 parts by weight of the maleimide resin, the total amount of the epoxy resin may be 5 parts by weight to 25 parts by weight.

In some embodiments, the resin composition of the present disclosure further comprises an organic silicone resin. The organic silicone resin (a.k.a. polysiloxane) suitable for the present disclosure may be any organic silicone resins known in the field to which this disclosure pertains, including but not limited to polyalkylsiloxane, polyarylsiloxane, polyalkarylsiloxane, modified polysiloxane or a combination thereof. These components should be construed as including their modifications. Preferably, the organic silicone resin suitable for the present disclosure is an amino-modified organic silicone resin, such as but not limited to amino-modified organic silicone resins KF-8010, X-22-161A, X-22-161B, KF-8012, KF-8008, X-22-9409, and X-22-1660B-3 available from Shin-Etsu Chemical Co., Ltd., amino-modified organic silicone resins BY-16-853U, BY-16-853, and BY-16-853B available from Toray-Dow Corning Co., Ltd., amino-modified organic silicone resins XF42-05742, XF42-C6252 and XF42-05379 available from Momentive Performance Materials JAPAN LLC, or a combination thereof.

Preferably, relative to a total of 100 parts by weight of the maleimide resin, the total amount of the organic silicone resin may be 5 parts by weight to 25 parts by weight.

The polyphenylene ether resin suitable for the present disclosure is not particularly limited and may be any one or more polyphenylene ether resins suitable for preparing a prepreg, a resin film, a laminate or a printed circuit board, including but not limited to hydroxyl-terminated polyphenylene ether, vinyl-containing polyphenylene ether, or a combination thereof. Preferably, the polyphenylene ether resin comprises a vinyl-containing polyphenylene ether. The vinyl-containing polyphenylene ether may include vinylbenzyl-terminated polyphenylene ether resin (e.g., OPE-2st available from Mitsubishi Gas Chemical Co., Inc.), methacrylate-terminated polyphenylene ether resin (e.g., SA9000 available from Sabic), vinylbenzyl-modified bisphenol A polyphenylene ether resin, vinyl-containing chain-extended polyphenylene ether resin, or a combination thereof. The vinyl-containing chain-extended polyphenylene ether may include various polyphenylene ethers disclosed in the US Patent Application Publication No. 2016/0185904 A1, all of which are incorporated herein by reference in their entirety.

The cyanate ester resin suitable for the present disclosure is not particularly limited and may include any one or more cyanate ester monomers, polymers or a combination thereof suitable for preparing a prepreg, a resin film, a laminate or a printed circuit board, such as a compound having an Ar—O—C≡N structure, wherein Ar may be a substituted or unsubstituted aromatic group. In some embodiments, the cyanate ester may include novolac cyanate ester resin, bisphenol A cyanate ester resin, bisphenol F cyanate ester resin, dicyclopentadiene-containing cyanate ester resin, naphthalene-containing cyanate ester resin, phenolphthalein cyanate ester resin, adamantane cyanate ester resin, fluorene cyanate ester resin or a combination thereof. The novolac cyanate ester resin may comprise bisphenol A novolac cyanate ester resin, bisphenol F novolac cyanate ester resin, phenol novolac cyanate ester resin or a combination thereof. For example, the cyanate ester resin may be available under the product name Primaset PT-15, PT-305, PT-605, BA-200, BA-230S, BA-30005, BTP-2500, BTP-60205, DT-4000, DT-7000, ULL-9505, HTL-300, CE-320, LUT-50 or LECy from Lonza.

The vinylbenzyl-dicyclopentadiene phenylene ether, bis(vinylbenzyl)ether, 1,2-bis(vinylphenyl)ethane, divinylbenzene, triallyl isocyanurate, triallyl cyanurate, 1,2,4-trivinyl cyclohexane, and diallyl bisphenol A suitable for the present disclosure are not particularly limited and may comprise various commercially available products.

In some embodiments, the resin composition of the present disclosure further comprises a triallyl isocyanurate (TAIC). Preferably, relative to a total of 100 parts by weight of the maleimide resin, the amount of the triallyl isocyanurate may be 1 part by weight to 5 parts by weight, such as 1 part by weight to 3 parts by weight.

The acrylate suitable for the present disclosure is not particularly limited and may include any one or more acrylates suitable for preparing a prepreg, a resin film, a laminate or a printed circuit board, such as but not limited to tricyclodecane di(meth)acrylate, tri(meth)acrylate, 1,1'-[(octahydro-4,7-methano-1H-indene-5,6-diyl) bis(methylene)]ester or a combination thereof.

The polyolefin suitable for the present disclosure is not particularly limited and may include any one or more polyolefins suitable for preparing a prepreg, a resin film, a laminate or a printed circuit board, such as but not limited to styrene-butadiene-divinylbenzene terpolymer, styrene-butadiene-maleic anhydride terpolymer, vinyl-polybutadiene-urethane oligomer, styrene-butadiene copolymer, hydrogenated styrene-butadiene copolymer, styrene-isoprene copolymer, hydrogenated styrene-isoprene copolymer, hydrogenated styrene-butadiene-divinylbenzene terpolymer, hydrogenated styrene-butadiene-maleic anhydride terpolymer, polybutadiene (homopolymer of butadiene), maleic anhydride-butadiene copolymer, methyl styrene copolymer or a combination thereof.

The active ester, styrene, phenolic resin, styrene maleic anhydride resin, amine curing agent, polyamide, or polyimide suitable for the present disclosure is not particularly limited and may include any one or more active esters, styrenes, phenolic resins, styrene maleic anhydride resins, amine curing agents, polyamides, or polyimides suitable for preparing a prepreg, a resin film, a laminate or a printed circuit board.

Moreover, in addition to the aforesaid components, the resin composition disclosed herein may optionally further comprise flame retardant, inorganic filler, curing accelerator, polymerization inhibitor, solvent, silane coupling agent, surfactant, coloring agent, toughening agent or a combination thereof. The amount of flame retardant, inorganic filler, curing accelerator, polymerization inhibitor, solvent, silane coupling agent, surfactant, coloring agent, or toughening agent, if any, may be ascertained routinely by a person having ordinary skill in the art.

The flame retardant suitable for the present disclosure may be any one or more flame retardants suitable for preparing a prepreg, a resin film, a laminate or a printed circuit board; examples include but are not limited to phosphorus-containing flame retardant, preferably including ammonium polyphosphate, hydroquinone bis(diphenyl phosphate), bisphenol A bis(diphenylphosphate), tri(2-carboxyethyl)phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, 9,10-dihydro-9-oxa-10-phosphaphenanthrene-10-oxide (DOPO) and its derivatives or resins, diphenylphosphine oxide (DPPO) and its derivatives or resins, melamine cyanurate, tris(2-hydroxyethyl)isocyanurate, aluminium phosphinate (e.g., commercially available OP-930 and OP-935), or a combination thereof.

For example, the flame retardant may be a DPPO compound (e.g., di-DPPO compound), a DOPO compound (e.g., di-DOPO compound), a DOPO resin (e.g., DOPO-HQ, DOPO-NQ, DOPO-PN, and DOPO-BPN), and a DOPO-containing epoxy resin, wherein DOPO-PN is a DOPO-containing phenol novolac resin, and DOPO-BPN may be a DOPO-containing bisphenol novolac resin, such as DOPO-BPAN (DOPO-bisphenol A novolac), DOPO-BPFN (DOPO-bisphenol F novolac) and DOPO-BPSN (DOPO-bisphenol S novolac).

The inorganic filler suitable for the present disclosure may be any one or more inorganic fillers suitable for preparing a prepreg, a resin film, a laminate or a printed circuit board; examples of inorganic filler include but are not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, mica, boehmite (AlOOH), calcined talc, talc, silicon nitride, calcined kaolin or a combination thereof. Moreover, the inorganic filler can be spherical, fibrous, plate-like, particulate, sheet-like, whisker-like or a combination thereof in shape and can be optionally pretreated by a silane coupling agent. In some embodiments, the inorganic filler used in the present disclosure is the spherical silica (SC-2500 SVJ) available from Admatechs. In some embodiments, relative to a total of 100 parts by weight of the maleimide resin, the resin composition according to the present disclosure comprises 1-300 parts by weight, 150-250 parts by weight, or 200-210 parts by weight of the inorganic filler.

The curing accelerator suitable for the present disclosure may comprise a catalyst, such as a Lewis base or a Lewis acid. The Lewis base may comprise imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP), 4-dimethylaminopyridine (DMAP) or a combination thereof. The Lewis acid may comprise metal salt compounds, such as those of manganese, iron, cobalt, nickel, copper and zinc, such as zinc octanoate or cobalt octanoate. The curing accelerator may include a curing initiator, such as a peroxide capable of producing free radicals; examples of the curing initiator may comprise, but not limited to: dicumyl peroxide, t-butyl peroxybenzoate, dibenzoyl peroxide (BPO), 2,5-dimethylethane-2,5-dihydroperoxide, 2,5-dimethyl-2,5-di(t-butylperoxy)-3-hexyne, di-t-butyl peroxide, α,α'-di(t-butylperoxy-m-isopropyl)benzene, 2,5-dimethyl-2,5-di(t-butylperoxy)hexane, di(t-butylperoxy)phthalate, di(t-butylperoxy)isophthalate, t-butyl peroxybenzoate, 2,2-di(t-butylperoxy)butane, 2,2-di(t-butylperoxy)octane, 2,5-dimethyl-2,5-di(benzoylperoxy)hexane, lauroyl peroxide, t-hexyl peroxypivalate, dibutylperoxyisopropylbenzene, bis(4-t-butylcyclohexyl) peroxydicarbonate, bis(trimethylsilyl) peroxide, trimethylsilyl phenyltriphenylsilyl peroxide, 2,3-trimethyl silyloxy-2,3-diphenylbutane, or a combination thereof. In some embodiments, the curing accelerator used in the present disclosure is 2-ethyl-4-methylimidazole. In some embodiments, relative to a total of 100 parts by weight of the maleimide resin, the resin composition according to the present disclosure comprises 0.01-5.0 parts by weight, 0.2-1.0 part by weight, or 0.5-0.6 part by weight of the curing accelerator.

The purpose of adding solvent according to the present disclosure is to dissolve the components in the resin composition so as to change the solid content of the resin composition and to adjust the viscosity of the resin composition. For example, the solvent suitable for the present disclosure may comprise, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol methyl ether, N-methylpyrrolidone, or a mixture thereof. For example, the solvent may be a mixture of methyl ethyl ketone and dimethylacetamide. The amount of solvent can be determined according to the need.

Silane coupling agent suitable for the present disclosure may comprise various silanes (such as but not limited to siloxanes) and a combination thereof, which may be further categorized according to the functional groups into amino silane, epoxide silane, vinyl silane, acrylate silane, methacrylate silane, hydroxyl silane, isocyanate silane, methacryloxy silane and acryloxy silane.

The purpose of adding toughening agent is to improve the toughness of the resin composition. The toughening agent suitable for the present disclosure may comprise, but not limited to, carboxyl-terminated butadiene acrylonitrile rubber (CTBN rubber), core-shell rubber, or a combination thereof.

The polymerization inhibitor, surfactant and coloring agent suitable for the present disclosure may be those commonly used in the present technical field when formulating a resin composition.

In some embodiments, the resin composition according to the present disclosure comprises a benzoxazine resin of Formula (1), a maleimide resin, an optional triallyl isocyanurate, an optional epoxy resin, an optional organic silicone resin, an inorganic filler, a curing accelerator and a solvent, or consists of a benzoxazine resin of Formula (1), a maleimide resin, an optional triallyl isocyanurate, an optional epoxy resin, an optional organic silicone resin, an inorganic filler, a curing accelerator and a solvent.

The resin compositions of various embodiments of the present disclosure may be processed by various methods into different articles, including but not limited to a prepreg, a resin film, a laminate or a printed circuit board.

The article made from the resin composition may be a prepreg, which comprises a reinforcement material and a layered structure formed thereon. The layered structure is formed by heating the resin composition at a high temperature to the B-stage. Suitable baking temperature for making the prepreg may be for example 80° C. to 170° C. For example, the reinforcement material may be any one of a fiber material, woven fabric, and non-woven fabric, and the woven fabric preferably comprises fiberglass fabrics. Types of fiberglass fabrics are not particularly limited and may be any commercial fiberglass fabric useful for various printed circuit boards, such as E-glass fiber fabric, D-glass fiber fabric, S-glass fiber fabric, T-glass fiber fabric, L-glass fiber fabric or Q-glass fiber fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. The woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pre-treated by a silane coupling agent. The prepreg may be further heated and cured to the C-stage to form an insulation layer.

The article made from the resin composition may be a resin film which is prepared by heating and baking to semi-cure the resin composition (B-stage). The resin composition may be selectively coated on a poly(ethylene terephthalate) film (PET film), a polyimide film (PI film), a liquid crystal polymer film or a copper foil, followed by heating and baking to semi-cure the resin composition to convert the resin composition into a resin film.

The resin composition according to the present disclosure can be used to make a laminate, which comprises two metal foils and an insulation layer (formed by curing the layered structure) disposed between the metal foils, wherein the insulation layer is made by curing the resin composition at high temperature and high pressure to the C-stage, a suitable curing temperature being for example between 150° C. and 220° C. and preferably between 190° C. and 210° C. and a suitable curing time being 90 to 200 minutes and preferably 120 to 180 minutes. The insulation layer may be obtained by curing the aforesaid prepreg or resin film. The metal foil may comprise copper, aluminum, nickel, platinum, silver, gold or an alloy thereof, such as a copper foil. Preferably, the laminate is a copper-clad laminate (CCL).

The laminate may be further processed by trace formation processes to provide a printed circuit board.

The resin compositions of the present disclosure and various articles made therefrom may preferably have any one, more (e.g., two, three, four, or five) or all of the following properties:

a glass transition temperature as measured by using a dynamic mechanical analyzer by reference to IPC-TM-650 2.4.24.4 of greater than or equal to 350° C., such as between 351° C. and 373° C.;

a T288 thermal resistance as measured by reference to IPC-TM-650 2.4.24.1 of greater than 70 minutes;

a dissipation factor at 10 GHz as measured by reference to JIS C2565 of less than or equal to 0.0066, such as between 0.0057 and 0.0066;

a percent of thermal expansion in Z-axis as measured by using a thermomechanical analyzer by reference to IPC-TM-650 2.4.24.5 in a temperature range of 50° C. to 260° C. of less than or equal to 0.50%, such as between 0.37% and 0.45%;

a coefficient of thermal expansion in Z-axis as measured by using a thermomechanical analyzer by reference to IPC-TM-650 2.4.24.5 in a temperature range of 50° C. to 110° C. of less than or equal to 15 ppm/° C., such as between 12 ppm/° C. and 15 ppm/° C.; and a coefficient of thermal expansion in Y-axis as measured by using a thermomechanical analyzer by reference to IPC-TM-650 2.4.24.5 in a temperature range of 50° C. to 110° C. of less than or equal to 9.0 ppm/° C., such as between 7.0 ppm/° C. and 8.8 ppm/° C.

Examples and embodiments are described in detail below to facilitate better understanding of the present disclosure. It will be understood that these examples and embodiments are exemplary only and are not intended to be limiting. Reagents used in the examples are commercially available from the market unless otherwise specified. Processes and conditions used in the examples are routine processes and conditions unless otherwise specified.

The names of reagents used in the Examples and Comparative Examples are as follows:

1. benzoxazine resin of Formula (1), A1 to A5, prepared by the Applicant.
2. polyphenylmethane maleimide, BMI-2300, available from Daiwakasei Industry Co., Ltd.
3. 3,3'-dimethyl-5,5'-diethyl-4,4'-diphenylmethane bis-maleimide, BMI-5100, available from Daiwakasei Industry Co., Ltd.
4. bisphenol A diphenyl ether bismaleimide, BMI-4000, available from Daiwakasei Industry Co., Ltd.
5. maleimide resin containing aliphatic long chain structure, BMI-3000, available from Designer Molecules Inc.
6. allyl-containing dicyclopentadiene benzoxazine resin, KZH-5031, available from Kolon.
7. diallyl bisphenol A benzoxazine resin A6, DABPA-Bz, prepared by the Applicant.
8. oxydianiline benzoxazine resin, PF-3500, available from Chang Chun Plastics.
9. bisphenol A benzoxazine resin, LZ 8290, available from Huntsman Corporation.
10. 4,4'-oxydianiline, gj0071, available from Changzhou Guanjia Chemical Co., Ltd.
11. diallyl bisphenol A, DABPA, available from Laizhou City Laiyu Chemical Co., Ltd.
12. triallyl isocyanurate, TAIC, available from Kingyorker Enterprise Co., Ltd.
13. naphthalene epoxy resin, HP-9500, available from DIC Corporation.
14. naphthalene epoxy resin, HP-6000, available from DIC Corporation.
15. biphenyl novolac epoxy resin, NC-3000-H, available from Nippon Kayaku.
16. amino-modified organic silicone resin, KF-8012, available from Shin-Etsu Chemical Co., Ltd.
17. amino-modified organic silicone resin, X-22-161B, available from Shin-Etsu Chemical Co., Ltd.
18. inorganic filler: spherical silica, SC2500-SVJ, available from Admatechs.
19. curing accelerator: 2-ethyl-4-methylimidazole, 2E4MI, available from Shikoku Chemicals Corp.
20. solvent: methyl ethyl ketone (MEK) and dimethylacetamide (DMAC), available from Sinopec Group.

Components A1 to A6 prepared by the Applicant used in the Examples and the Comparative Examples correspond to the products obtained from Preparation Example 1 to Preparation Example 6 below.

Preparation Example 1: Synthesis of A1 (Benzoxazine Resin of Formula (2))

To a 500 ml three-necked flask equipped with a stirring rod and a condensation pipe, 60 ml of chloroform was added. At room temperature, 0.1 mole (20.02 g) of 4,4'-oxydianiline and 0.2 mole (61.68 g) of diallyl bisphenol A were added. After 30-minute of stirring, 0.8 mole (24 g) of formaldehyde solution was added, followed by heating to 80° C. to 100° C. and continuously stirring. The reaction was then refluxed for 3 to 6 hours with temperature controlled, followed by cooling to room temperature. After adding 0.2 mole (18.62 g) of aniline, 0.8 mole (24 g) of formaldehyde solution was added again, followed by heating to 80° C. to 100° C. and continuously stirring. The reaction was then refluxed for 3 to 6 hours with temperature controlled and then completed. The reaction mixture was poured to excessive anhydrous diethyl ether and washed with 3 mol/L NaOH solution and deionized water. Anhydrous diethyl ether was removed after oil phase separation to obtain brown viscous liquid state product, which is a benzoxazine resin of Formula (2), wherein n is an integer of 0 to 10.

Fourier transform infrared spectroscopy (FTIR) analysis of Product A1 prepared in Preparation Example 1, as shown in the sole FIGURE, reveals the presence of oxazine ring characteristic absorption peak at 946.44 cm$^{-1}$, aromatic ether bond (Ar—O) vibration peak at 1231.24 cm$^{-1}$, and C=C stretch vibration peak at 1650.80 cm$^{-1}$, indicating that the product obtained from Preparation Example 1 is a benzoxazine resin of the present disclosure.

Preparation Example 2: Synthesis of A2 (Benzoxazine Resin of Formula (3))

0.1 mole (19.83 g) of 4,4'-diaminodiphenylmethane was used to replace 0.1 mole (20.02 g) of 4,4'-oxydianiline, and the remaining steps were the same as Preparation Example 1. The product thus obtained is a benzoxazine resin of Formula (3), wherein n is an integer of 0 to 10.

Preparation Example 3: Synthesis of A3 (Benzoxazine Resin of Formula (4))

0.2 mole (11.42 g) of allyl amine was used to replace 0.2 mole (18.62 g) of aniline, and the remaining steps were the same as Preparation Example 1. The product thus obtained is a benzoxazine resin of Formula (4), wherein n is an integer of 0 to 10.

Preparation Example 4: Synthesis of A4 (Benzoxazine Resin of Formula (5))

0.2 mole (53.27 g) of diallyl dihydroxybiphenyl was used to replace 0.2 mole (61.68 g) of diallyl bisphenol A, and the remaining steps were the same as Preparation Example 1. The product thus obtained is a benzoxazine resin of Formula (5), wherein n is an integer of 0 to 10.

Preparation Example 5: Synthesis of A5 (Benzoxazine Resin of Formula (6))

0.1 mole (18.42 g) of 4,4'-diaminodiphenyl was used to replace 0.1 mole (20.02 g) of 4,4'-oxydianiline, and the remaining steps were the same as Preparation Example 1. The product thus obtained is a benzoxazine resin of Formula (6), wherein n is an integer of 0 to 10.

Preparation Example 6: Synthesis of Diallyl Bisphenol A Benzoxazine Resin A6

To a 500 ml three-necked flask equipped with a stirring rod and a condensation pipe, 60 ml of chloroform was added. At room temperature, 0.2 mole (18.62 g) of aniline and 0.1 mole (61.68 g) of diallyl bisphenol A were added. After 30-minute of stirring, 0.8 mole (24 g) of formaldehyde solution was added, followed by heating to 80° C. to 100° C. and continuously stirring. The reaction was then refluxed for 3 to 6 hours with temperature controlled, followed by cooling to room temperature. The reaction mixture was poured to excessive anhydrous diethyl ether and washed with 3 mol/L NaOH solution and deionized water. Anhydrous diethyl ether was removed after oil phase separation to obtain pale yellow viscous liquid state product, which is a diallyl bisphenol A benzoxazine resin.

Raw materials above were used to prepare the resin compositions of various Examples (Table 1 and Table 2) and Comparative Examples (Table 3) of the present disclosure and further fabricated to prepare test samples or articles.

Formulation of resin composition: Components of each resin composition listed in Table 1 to Table 3 were well-mixed to the homogeneous state to obtain the corresponding resin composition sample.

TABLE 1

Resin compositions of Examples E1 to E5
(in part by weight)

| Component | | E1 | E2 | E3 | E4 | E5 |
|---|---|---|---|---|---|---|
| benzoxazine resin of Formula (1) | A1 | 25 | | | | |
| | A2 | | 25 | | | |
| | A3 | | | 25 | | |
| | A4 | | | | 25 | |
| | A5 | | | | | 25 |
| maleimide resin | BMI-2300 | 65 | 65 | 65 | 65 | 65 |
| | BMI-5100 | 35 | 35 | 35 | 35 | 35 |
| | BMI-4000 | | | | | |
| | BMI-3000 | | | | | |
| triallyl isocyanurate | TAIC | | | | | |

TABLE 1-continued

Resin compositions of Examples E1 to E5
(in part by weight)

| Component | | E1 | E2 | E3 | E4 | E5 |
|---|---|---|---|---|---|---|
| resin | HP-9500 | | | | | |
| | HP-6000 | | | | | |
| | NC-3000-H | | | | | |
| organic silicone resin | KF-8012 | | | | | |
| | X-22-161B | | | | | |
| inorganic filler | SC2500-SVJ | 200 | 200 | 200 | 200 | 200 |
| curing accelerator | 2E4MI | 0.5 | 0.5 | 0.5 | 0.5 | 0.5 |
| solvent | MEK:DMAC = 2:1 | PA | PA | PA | PA | PA |

TABLE 2

Resin compositions of Examples E6 to E10
(in part by weight)

| Component | | E6 | E7 | E8 | E9 | E10 |
|---|---|---|---|---|---|---|
| benzoxazine resin of Formula (1) | A1 | 10 | 40 | 25 | 25 | 15 |
| | A2 | | | | | 5 |
| | A3 | | | | | 5 |
| | A4 | | | | | 5 |
| | A5 | | | | | |
| maleimide resin | BMI-2300 | 65 | 65 | 65 | 65 | 50 |
| | BMI-5100 | 35 | 35 | 35 | 35 | 30 |
| | BMI-4000 | | | | | 15 |
| | BMI-3000 | | | | | 5 |
| triallyl isocyanurate | TAIC | | | | | 3 |
| epoxy resin | HP-9500 | | | 25 | 5 | 5 |
| | HP-6000 | | | | | 5 |
| | NC-3000-H | | | | | 5 |
| organic silicone resin | KF-8012 | | | | | 5 |
| | X-22-161B | | | | | 5 |
| inorganic filler | SC2500-SVJ | 200 | 200 | 200 | 200 | 210 |
| curing accelerator | 2E4MI | 0.5 | 0.5 | 0.5 | 0.5 | 0.6 |
| solvent | MEK:DMAC = 2:1 | PA | PA | PA | PA | PA |

TABLE 3

Resin compositions of Comparative Examples C1 to C8
(in part by weight)

| Component | | C1 | C2 | C3 | C4 | C5 | C6 | C7 | C8 |
|---|---|---|---|---|---|---|---|---|---|
| maleimide resin | BMI-2300 | 65 | 65 | 65 | 65 | 65 | 65 | 65 | 65 |
| | BMI-5100 | 35 | 35 | 35 | 35 | 35 | 35 | 35 | 35 |
| | BMI-4000 | | | | | | | | |
| | BMI-3000 | | | | | | | | |
| conventional benzoxazine resin | KZH-5031 | 5 | | | | 25 | | | |
| | DABPA-Bz | | 18 | 20 | | | 25 | | |
| | PF-3500 | 20 | 7 | | 10 | | | 25 | |
| | LZ 8290 | | | | | | | | 25 |
| 4,4-oxydianiline | gj0071 | | | 5 | | | | | |
| diallyl bisphenol A | DABPA | | | | 15 | | | | |
| inorganic filler | SC2500-SVJ | 200 | 200 | 200 | 200 | 200 | 200 | 200 | 200 |
| curing accelerator | 2E4MI | 0.5 | 0.5 | 0.5 | 0.5 | 0.5 | 0.5 | 0.5 | 0.5 |
| solvent | MEK:DMAC = 2:1 | PA | PA | PA | PA | PA | PA | PA | PA |

For the property tests of resin compositions of Examples E1 to E10 and Comparative Examples C1 to C8 listed in Table 4 to Table 5, samples (specimens) were prepared as described below and tested under specified conditions as follows.

Test samples were prepared as follows.

1. Prepreg: Components of the resin composition from each Example (Table 1 to Table 2) or each Comparative Example (Table 3) were well-mixed to form a varnish, which was then loaded to an impregnation tank; the amount "PA" of the solvent mixture containing methyl ethyl ketone and dimethylacetamide in a weight ratio of 2:1 represents a "proper amount" of the solvent mixture sufficient to achieve a solid content of the resin composition in the varnish of 75% (S/C=75%); then a fiberglass fabric (e.g., 2116 E-glass fiber fabric or 106 E-glass fiber fabric, both available from Asahi) was impregnated into the impregnation tank to adhere the resin composition onto the fiberglass fabric, followed by heating at 150° C. to 170° C. to the B-stage to obtain a prepreg.

2. Copper-clad laminate (5-ply, formed by lamination of five prepregs): Two 18 μm HTE (High Temperature Elongation) copper foils and five prepregs obtained from 2116 E-glass fiber fabrics impregnated with each Example or Comparative Example were prepared, each prepreg having a resin content of about 55 wt %. An HTE copper foil, five prepregs and an HTE copper foil were superimposed in such order and then subjected to a vacuum condition for lamination at 420 psi and 200° C. for 2 hours to form each copper-clad laminate sample. Insulation layers between the two copper foils were formed by laminating five sheets of prepreg, and the resin content of the insulation layers is about 55 wt %.

3. Copper-free laminate (5-ply, formed by lamination of five prepregs): Each aforesaid copper-clad laminate was etched to remove the copper foils on both sides to obtain a copper-free laminate (5-ply), which is formed by laminating five sheets of prepreg and has a resin content of about 55 wt %.

4. Copper-free laminate (1-ply, formed by lamination of one prepreg): Two 18 μm HTE (High Temperature Elongation) copper foils and one prepreg obtained from a 2116 E-glass fiber fabric impregnated with each Example or Comparative Example were prepared, each prepreg having a resin content of about 55 wt %. A copper foil, one prepreg and a copper foil were superimposed in such order and then subjected to a vacuum condition for lamination at 420 psi and 200° C. for 2 hours to form each copper-clad laminate sample (1-ply, formed by lamination of one prepreg). Next, each copper-clad laminate was etched to remove the copper foils on both sides to obtain a copper-free laminate (1-ply) which is formed by laminating one prepreg and has a resin content of about 55 wt %.

5. Copper-free laminate (2-ply, formed by lamination of two prepregs): Two 18 μm HTE (High Temperature Elongation) copper foils and two prepregs obtained from 106 E-glass fiber fabrics impregnated with each Example or Comparative Example were prepared, each prepreg having a resin content of about 76 wt %. A copper foil, two prepregs and a copper foil were superimposed in such order and then subjected to a vacuum condition for lamination at 420 psi and 200° C. for 2 hours to form each copper-clad laminate sample (2-ply, formed by lamination of two prepregs). Next, each copper-clad laminate was etched to remove the copper foils on both sides to obtain a copper-free laminate (2-ply) which is formed by laminating two prepregs and has a resin content of about 76 wt %.

Each sample was analyzed as described below.

1. Glass Transition Temperature (Tg)

A copper-free laminate sample (5-ply) was subjected to the glass transition temperature measurement. A dynamic mechanical analyzer (DMA) was used by reference to IPC-TM-650 2.4.24.4 "Glass Transition and Modulus of Materials Used in High Density Interconnection (HDI) and Microvias-DMA Method" to measure the glass transition temperature (° C.) of each sample. Temperature interval during the measurement was set at 50-400° C. with a temperature increase rate of 2° C./minute; higher glass transition temperature is more preferred.

2. T288 Thermal Resistance

The aforesaid copper-clad laminate (5-ply) was used as the sample and subjected to the T288 thermal resistance test. At a constant temperature of 288° C., a thermomechanical analyzer (TMA) was used by reference to IPC-TM 650 2.4.24.1 "Time to Delamination (TMA Method)" to measure each sample and record the time to delamination; if delamination was not observed after heating for 70 minutes, a designation of ">70" was given.

3. Dissipation Factor (Df)

In the dissipation factor measurement, the copper-free laminate (2-ply) sample was tested by using a microwave dielectrometer available from AET Corp. by reference to JIS C2565 "Measuring methods for ferrite cores for microwave device" at 10 GHz for analyzing each sample. Lower dissipation factor represents better dielectric properties of the sample. A difference in Df of less than 0.0005 represents no substantial difference in dissipation factor of different laminates, and a difference in Df of greater than or equal to 0.0005 represents a substantial difference in dissipation factor of different laminates.

4. Percent of Thermal Expansion in Z-Axis (Z-PTE)

The copper-free laminate (5-ply) sample was subjected to thermal mechanical analysis (TMA) during the measurement of the percent of thermal expansion in Z-axis. Each sample was heated from 50° C. to 260° C. at a heating rate of 10° C./minute and then subjected to the measurement of the percent (%) of thermal expansion in Z-axis in a temperature range of 50° C. to 260° C. by reference to IPC-TM-650 2.4.24.5. Lower percent of thermal expansion in Z-axis represents a better property of the sample, and a difference of greater than or equal to 0.1% in the percent of thermal expansion in Z-axis represents a substantial difference.

5. Coefficient of Thermal Expansion in Z-Axis (Z-CTE)

The copper-free laminate (5-ply) sample was subjected to thermal mechanical analysis (TMA) during the measurement of the coefficient of thermal expansion in Z-axis. Each sample was heated from 50° C. to 260° C. at a heating rate of 10° C./minute and then subjected to the measurement of the coefficient (ppm/° C.) of thermal expansion in Z-axis in a temperature range (designated as al) of 50° C. to 110° C. by reference to IPC-TM-650 2.4.24.5. Lower coefficient of thermal expansion in Z-axis represents a better property of the sample, and a difference of greater than or equal to 2 ppm/° C. in the coefficient of thermal expansion in Z-axis represents a substantial difference.

6. Coefficient of Thermal Expansion in Y-Axis (Y-CTE)

The copper-free laminate (1-ply) sample was subjected to thermal mechanical analysis (TMA) during the measurement of the coefficient of thermal expansion in Y-axis. Each sample was heated from 50° C. to 260° C. at a heating rate of 10° C./minute and then subjected to the measurement of the coefficient (ppm/° C.) of thermal expansion in Y-axis in a temperature range (designated as al) of 50° C. to 110° C. by reference to IPC-TM-650 2.4.24.5. Lower coefficient of thermal expansion in Y-axis represents a better property of the sample, and a difference of greater than or equal to 1 ppm/° C. in the coefficient of thermal expansion in Y-axis represents a substantial difference.

TABLE 4

Test results of articles made from resin compositions of Examples E1 to E10

| Item | Unit | E1 | E2 | E3 | E4 | E5 | E6 | E7 | E8 | E9 | E10 |
|---|---|---|---|---|---|---|---|---|---|---|---|
| Tg (DMA) | °C. | 365 | 362 | 366 | 372 | 373 | 351 | 370 | 360 | 358 | 352 |
| T288 | minute | >70 | >70 | >70 | >70 | >70 | >70 | >70 | >70 | >70 | >70 |
| Df @ 10 GHz | — | 0.0060 | 0.0060 | 0.0058 | 0.0058 | 0.0059 | 0.0057 | 0.0063 | 0.0066 | 0.0063 | 0.0066 |
| Z-PTE | % | 0.40 | 0.42 | 0.43 | 0.39 | 0.42 | 0.45 | 0.37 | 0.40 | 0.42 | 0.43 |
| Z-CTE ($\alpha 1$) | ppm/°C. | 13 | 14 | 14 | 14 | 13 | 15 | 14 | 13 | 12 | 14 |
| Y-CTE ($\alpha 1$) | ppm/°C. | 8.2 | 8.3 | 8.4 | 8.1 | 8.1 | 8.8 | 8.0 | 7.5 | 7.9 | 7.0 |

TABLE 5

Test results of articles made from resin compositions of Comparative Examples C1 to C8

| Item | Unit | C1 | C2 | C3 | C4 | C5 | C6 | C7 | C8 |
|---|---|---|---|---|---|---|---|---|---|
| Tg (DMA) | °C. | 325 | 330 | 335 | 330 | 325 | 337 | 325 | 315 |
| T288 | minute | 50 | >70 | >70 | >70 | 5 | >70 | >70 | >70 |
| Df @ 10 GHz | — | 0.0073 | 0.0077 | 0.0078 | 0.0087 | 0.0083 | 0.0080 | 0.0079 | 0.0086 |
| Z-PTE | % | 0.68 | 0.62 | 0.61 | 0.64 | 0.72 | 0.60 | 0.65 | 0.66 |
| Z-CTE ($\alpha 1$) | ppm/°C. | 25 | 22 | 21 | 23 | 27 | 20 | 23 | 27 |
| Y-CTE ($\alpha 1$) | ppm/°C. | 10.9 | 10.8 | 10.2 | 12.1 | 11.5 | 10.3 | 11.5 | 13.0 |

The following observations can be made from Table 1 to Table 5.

From the comparison of Examples E1 to E5 which comprise resin compositions using a benzoxazine resin of Formula (1) according to the present disclosure with Comparative Examples which comprise resin compositions using a conventional benzoxazine resin (e.g., Comparative Example C5 using an allyl-containing dicyclopentadiene benzoxazine resin, Comparative Example C6 using a diallyl bisphenol A benzoxazine resin, Comparative Example C7 using an oxydianiline benzoxazine resin, Comparative Example C8 using a bisphenol A benzoxazine resin, and Comparative Example C1 using an allyl-containing dicyclopentadiene benzoxazine resin in conjunction with an oxydianiline benzoxazine resin), it can be found that Examples E1 to E5 all achieve excellent high glass transition temperature, low dissipation factor, low percent of thermal expansion in Z-axis, low coefficient of thermal expansion in Z-axis and low coefficient of thermal expansion in Y-axis.

From the comparison of Example E1 which comprises a resin composition using a benzoxazine resin of Formula (2) according to the present disclosure (synthesized from oxydianiline and diallyl bisphenol A) with Comparative Example C2 which contains an oxydianiline benzoxazine resin and a diallyl bisphenol A benzoxazine resin, it can be found that Example E1 achieves higher glass transition temperature and lower dissipation factor, percent of thermal expansion in Z-axis, coefficient of thermal expansion in Z-axis and coefficient of thermal expansion in Y-axis.

From the comparison of Example E1 which comprises a resin composition using a benzoxazine resin of Formula (2) according to the present disclosure (synthesized from oxydianiline and diallyl bisphenol A) with Comparative Example C3 which contains an oxydianiline and a diallyl bisphenol A benzoxazine resin and Comparative Example C4 which contains an oxydianiline benzoxazine resin and a diallyl bisphenol A, it can be found that Example E1 achieves higher glass transition temperature and lower dissipation factor, percent of thermal expansion in Z-axis, coefficient of thermal expansion in Z-axis and coefficient of thermal expansion in Y-axis.

Overall, articles made from resin compositions using a benzoxazine resin of Formula (1) according to the present disclosure and a maleimide resin have excellent high glass transition temperature, low dissipation factor, low percent of thermal expansion in Z-axis, low coefficient of thermal expansion in Z-axis and low coefficient of thermal expansion in Y-axis. In addition, the resin compositions may further comprise epoxy resin, organic silicone resin and triallyl isocyanurate (e.g., Example E10) to further lower the coefficient of thermal expansion in Y-axis without influencing other properties.

The above detailed description is merely illustrative in nature and is not intended to limit the embodiments of the subject matter or the applications and uses of such embodiments. As used herein, the term "exemplary" or similar expression means "serving as an example, instance, or illustration." Any implementation described herein as exemplary is not necessarily to be construed as preferred or advantageous over other implementations, unless otherwise specified.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments and equivalents thereof. Also, the scope defined by the claims includes known equivalents and foreseeable equivalents at the time of filing this patent application.

What is claimed is:

1. A resin composition, comprising:
   (A) a maleimide resin; and
   (B) a benzoxazine resin of Formula (1):

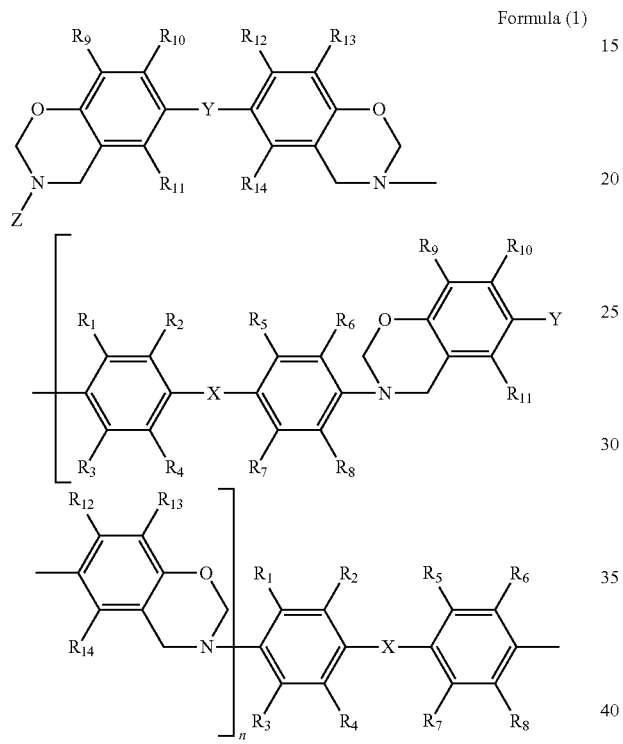

Formula (1)

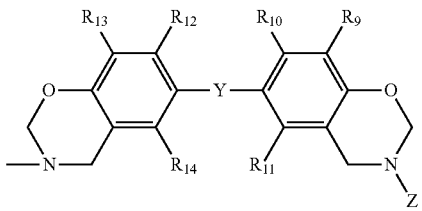

-continued wherein, each X is independently a covalent bond, —O— or —CH$_2$—;

each Y is independently a covalent bond or —C(CH$_3$)$_2$—;

each Z is independently an alkyl group with 1 to 8 carbon atoms, an alkenyl group with 2 to 8 carbon atoms, a phenyl group or a benzyl group;

R$_1$, R$_2$, R$_3$, R$_4$, R$_5$, R$_6$, R$_7$ and R$_8$ each independently represent a hydrogen atom, a methyl group or an ethyl group;

R$_9$, R$_{10}$, R$_{11}$, R$_{12}$, R$_{13}$ and R$_{14}$ each independently represent a hydrogen atom or an alkenyl group with 2 to 4 carbon atoms, and at least one of R$_9$, R$_{10}$, R$_{11}$, R$_{12}$, R$_{13}$ and R$_{14}$ represents an alkenyl group with 2 to 4 carbon atoms; and n is an integer of 0 to 10.

2. The resin composition of claim 1, wherein the benzoxazine resin of Formula (1) comprises a benzoxazine resin of Formula (2), a benzoxazine resin of Formula (3), a benzoxazine resin of Formula (4), a benzoxazine resin of Formula (5), a benzoxazine resin of Formula (6) or a combination thereof:

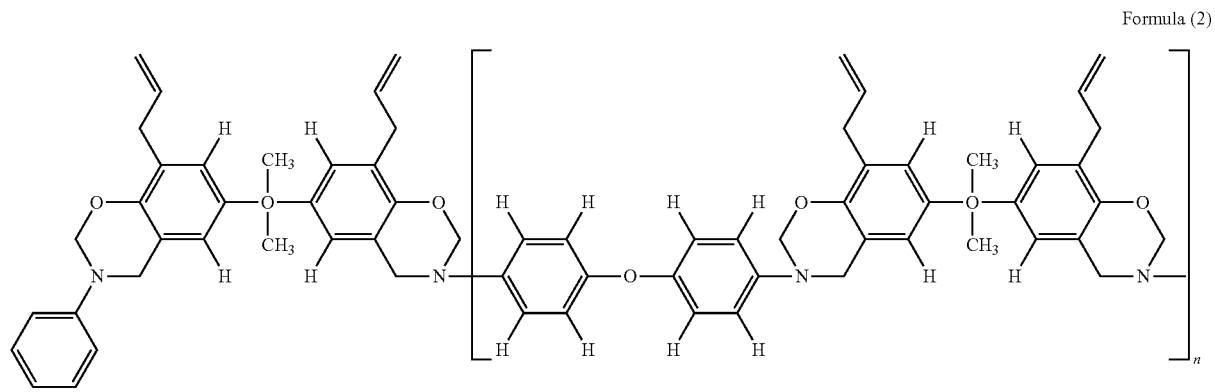

Formula (2)

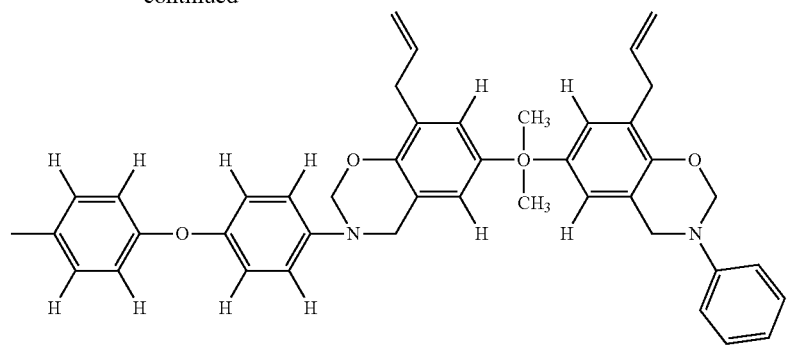
Formula (3)
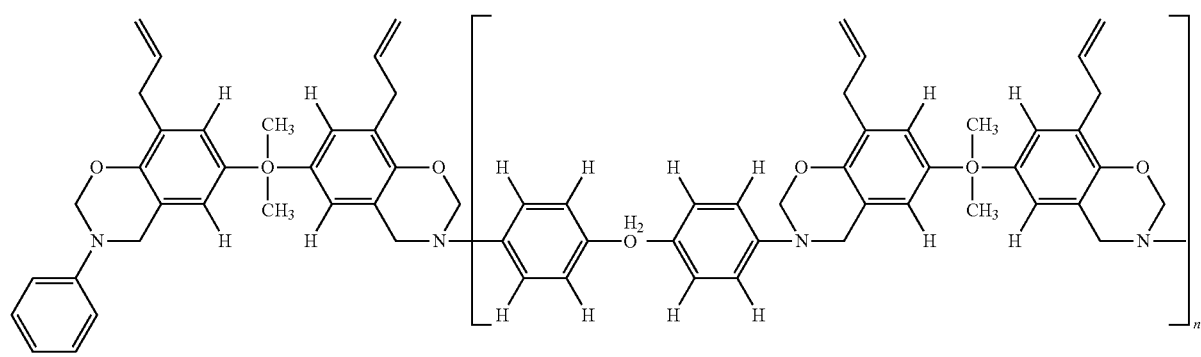
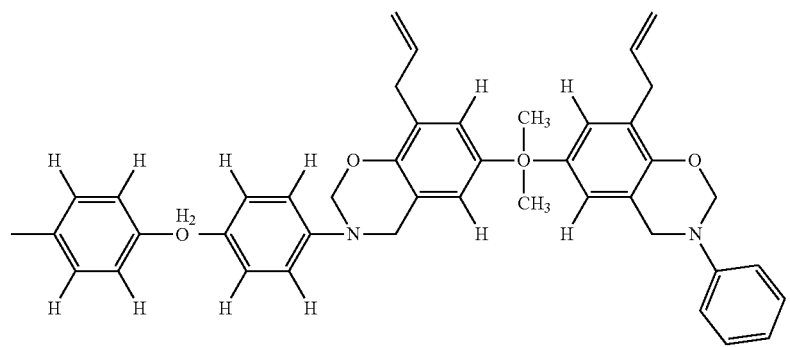
Formula (4)
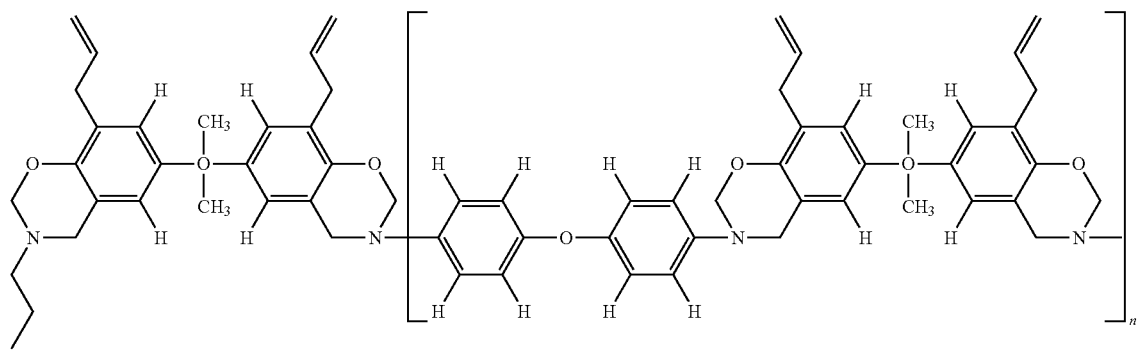

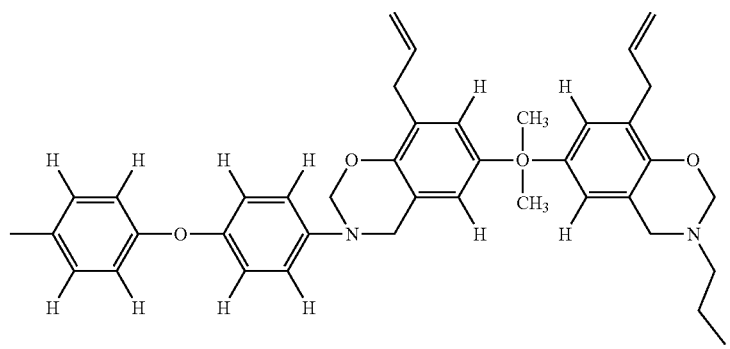
Formula (5)
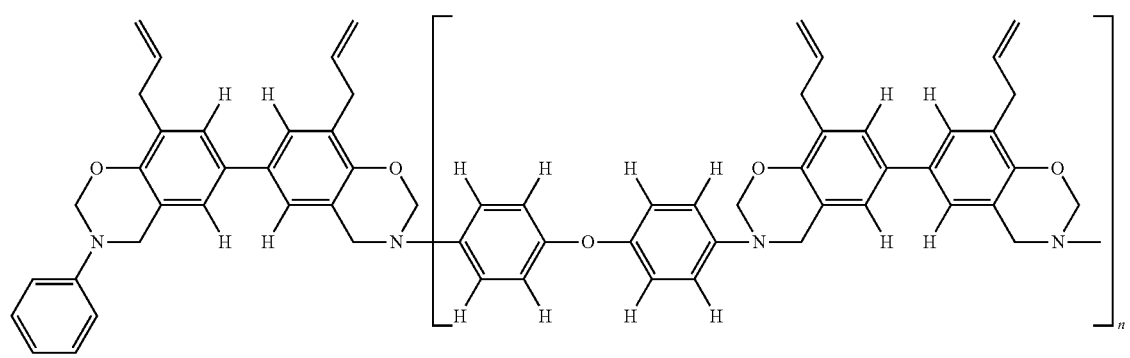
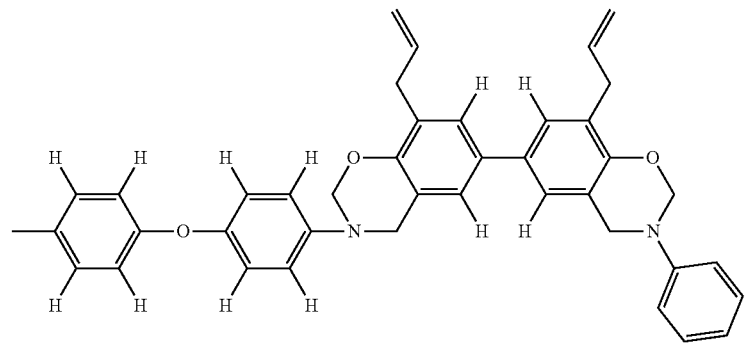
Formula (6)
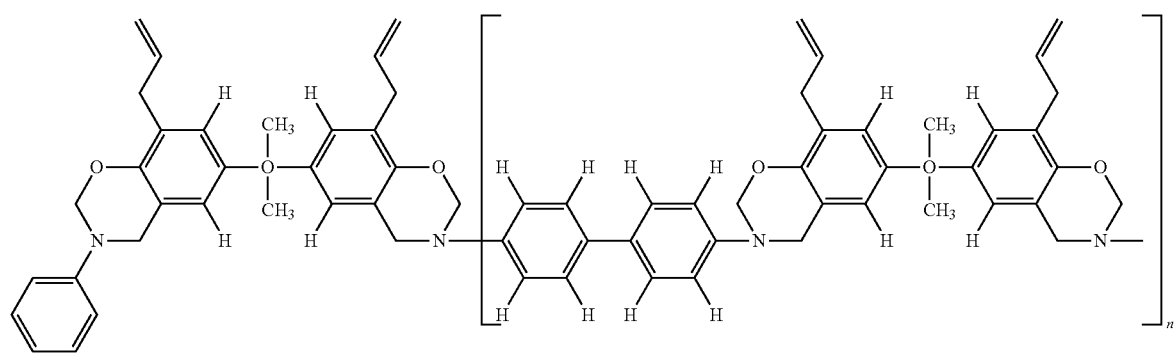

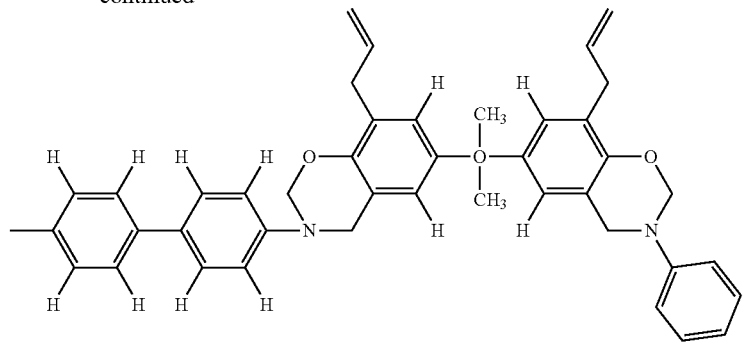

n is an integer of 0 to 10 in Formula (2) to Formula (6).

3. The resin composition of claim 1, wherein a weight ratio of the maleimide resin and the benzoxazine resin of Formula (1) is 100:10-40.

4. The resin composition of claim 1, wherein the maleimide resin comprises 4,4'-diphenylmethane bismaleimide, polyphenylmethane maleimide, bisphenol A diphenyl ether bismaleimide, 3,3'-dimethyl-5,5'-diethyl-4,4'-diphenylmethane bismaleimide, 3,3'-dimethyl-5,5'-dipropyl-4,4'-diphenylmethane bismaleimide, m-phenylene bismaleimide, 4-methyl-1,3-phenylene bismaleimide, 1,6-bismaleimide-(2,2,4-trimethyl)hexane, N-2,3-xylylmaleimide, N-2,6-xylylmaleimide, N-phenyl maleimide, vinyl benzyl maleimide, maleimide resin containing aliphatic long chain structure, prepolymer of diallyl compound and maleimide resin, prepolymer of diamine and maleimide resin, prepolymer of multi-functional amine and maleimide resin, prepolymer of acid phenol compound and maleimide resin, or a combination thereof.

5. The resin composition of claim 1, further comprising a component (C) which comprises epoxy resin, organic silicone resin, polyphenylene ether resin, cyanate ester resin, active ester, vinylbenzyl-dicyclopentadiene phenylene ether, bis(vinylbenzyl) ether, 1,2-bis(vinylphenyl)ethane, divinylbenzene, triallyl isocyanurate, triallyl cyanurate, 1,2,4-trivinyl cyclohexane, diallyl bisphenol A, styrene, acrylate, polyolefin, phenolic resin, styrene maleic anhydride resin, amine curing agent, polyamide, polyimide, or a combination thereof.

6. The resin composition of claim 5, wherein a weight ratio of (A) the maleimide resin and the component (C) is 100:1-100.

7. The resin composition of claim 1, further comprising flame retardant, inorganic filler, curing accelerator, polymerization inhibitor, solvent, silane coupling agent, surfactant, coloring agent, toughening agent or a combination thereof.

8. An article made from the resin composition of claim 1, wherein the article comprises a prepreg, a resin film, a laminate, or a printed circuit board.

9. The article of claim 8, having a glass transition temperature as measured by using a dynamic mechanical analyzer by reference to IPC-TM-650 2.4.24.4 of greater than or equal to 350° C.

10. The article of claim 8, having a T288 thermal resistance as measured by reference to IPC-TM-650 2.4.24.1 of greater than 70 minutes.

11. The article of claim 8, having a dissipation factor at 10 GHz as measured by reference to JIS C2565 of less than or equal to 0.0066.

12. The article of claim 8, having a percent of thermal expansion in Z-axis as measured by using a thermomechanical analyzer by reference to IPC-TM-650 2.4.24.5 in a temperature range of 50° C. to 260° C. of less than or equal to 0.50%.

13. The article of claim 8, having a coefficient of thermal expansion in Z-axis as measured by using a thermomechanical analyzer by reference to IPC-TM-650 2.4.24.5 in a temperature range of 50° C. to 110° C. of less than or equal to 15 ppm/° C.

14. The article of claim 8, having a coefficient of thermal expansion in Y-axis as measured by using a thermomechanical analyzer by reference to IPC-TM-650 2.4.24.5 in a temperature range of 50° C. to 110° C. of less than or equal to 9.0 ppm/° C.

* * * * *